United States Patent
DeFilippi et al.

(12) 
(10) Patent No.: US 6,268,307 B1
(45) Date of Patent: *Jul. 31, 2001

(54) TITANIA BOUND SODIUM TITANATE ION EXCHANGER

(75) Inventors: Irene C. G. DeFilippi, Palatine; Stephen Frederic Yates, Arlington Heights; Jian-Kun Shen, Cook County; Romulus Gaita, Morton Grove; Robert Henry Sedath, Bensenville; Gary Joseph Seminara, Wonder Lake, all of IL (US); Michael Peter Straszewski, Novi, MI (US); David Joseph Anderson, Oak Lawn, IL (US)

(73) Assignee: AlliedSignal Inc., Morris Township, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/185,020

(22) Filed: Nov. 3, 1998

(Under 37 CFR 1.47)

Related U.S. Application Data

(63) Continuation-in-part of application No. 08/546,448, filed on Oct. 20, 1995, now Pat. No. 5,885,925.

(51) Int. Cl.⁷ .............................. B01J 26/04; B01J 26/06; C01G 23/04
(52) U.S. Cl. .................... 502/427; 502/350; 502/439; 423/578; 423/608
(58) Field of Search .................................... 502/427, 349, 502/350, 513, 516, 439; 423/598, 608

(56) References Cited

U.S. PATENT DOCUMENTS

| 4,156,646 | 5/1979 | Schulz ............................ 210/28 |
| 5,177,045 | 1/1993 | Anthony et al. ............. 502/164 |
| 5,352,644 | 10/1994 | Timken ........................ 502/60 |
| 5,885,925 | * 3/1999 | DeFilippi et al. . |

FOREIGN PATENT DOCUMENTS

WO 94/19277    9/1994   (WO) .

OTHER PUBLICATIONS

J. Rehto; J. Radioanal Nucl Chem, Letters, 118: 1–13 (1987) No month.

R.G. Dosch, "Final Report on the Application of Titanates, Niobates, and Tantalates to Neutralized Defense Waste Contamination Materials Properties, Physical Forms and Regeneration Techniques; National Techical Information Service" (1981) No month.

R.M. Merrill; Journal of Radioanalytical Chemistry: 43:93–100 (1978) (No month).

J. Lehto et al.; J.Chem. Soc. Dalton Trans., 101–103 (1989) (No month).

S.P. Mishra et al.: J. Radioanalytical and Nuclear Chemistry, Articles; 162:2, 299–305 (1992) (No month).

M. Watanabe; Journal of Solid State Chemistry, 36: 91–96 (1981) No month.

J. Akimoto et al., Journal of Solid State Chemistry, 90:147–154 (1991) No month.

H. Leinonen et al., Reactive Polymers, 23: 221–228 (1994) No month.

Lehto et al.; Radiochem. Radioanal. Letters, 50:6, 375–384 (1982) No month.

Anthony et al. *Waste Management*, 13: 503–512 (1993) No month.

Anthony et al. *Catalysis Today*, 14: 253–268 (1992) No month.

\* cited by examiner

*Primary Examiner*—Steven P. Griffin
*Assistant Examiner*—Christina Ildebrando
(74) *Attorney, Agent, or Firm*—Colleen D. Szuch

(57) ABSTRACT

A titania bound ion exchange composition is prepared by admixing crystalline sodium titanate and a hydrolyzable titanium compound and then drying the titania bound crystalline sodium titanate. The dried titania bound ion exchange composition is subjected to optional compaction and calcination steps to improve the physical strength of the titania bound composition.

29 Claims, 12 Drawing Sheets

TITANIA BOUND SODIUM TITANATE ION EXCHANGER

CROSS-REFERENCE TO RELATED APPLICATION

This application is a continuation-in-part of U.S. patent application Ser. No. 08/546,448, filed Oct. 20, 1995 now U.S. Pat. No. 5,885,925.

BACKGROUND OF THE INVENTION

1. Field of the Invention

This invention is directed to ion exchange compositions; and more particularly to a titania bound ion exchange composition comprising a crystalline sodium titanate and a hydrolyzable titanium compound.

2. Description of the Art

Ever since nuclear weapons were first produced at the end of World War II, large amounts of nuclear waste have been generated and stored at various facilities. The nuclear waste, which consists largely of the byproducts of uranium and plutonium production and purification, was disposed of in ways which were deemed suitable at the time, but which in retrospect are now inadequate. Much of the nuclear waste is now stored in tanks as a highly alkaline mixture of salts and liquids which, if not recovered and properly remediated, will potentially create severe environmental problems.

Most of the stored aqueous nuclear waste is alkaline (pH 14), and contains high concentrations of sodium nitrate. The tanks contain various complexing agents, fission products, transuranic elements and other materials. Much of the stored nuclear waste is in the form of sludge created when alkali was added to the waste to prevent tank corrosion. Some of the radioactive material has been incorporated into salt cakes which is the evaporative product of the alkaline aqueous material. It is desired to remove the radioactive elements from the waste in order to allow for subsequent safe disposal of the non-radioactive materials. The removal of two of the metallic radionuclides, cesium and strontium, is particularly important because their half-lives are long enough to represent a hazard for an extended period of time.

Sodium nonatitanate is known as a strontium ion exchanger. J. Lehto; J. Radioanal. Nucl. Chem. Letters, 118: 1–13 (1987) describes the ion exchange behavior of $Na_4Ti_9O_{20} \cdot xH_2O$ toward strontium. The sodium titanate was prepared hydrothermally at 300° C. followed by boiling with NaOH.

Other references that disclose the preparation and use of sodium titanates as strontium ion exchangers include R. G. Dosch, "Final Report on the Application of Titanates, Niobates, and Tantalates to Neutralized Defense Waste Contamination Materials Properties, Physical Forms and Regeneration Techniques; National Technical Information Service" (1981); R. M. Merrill; *Journal of Radioanalytical Chemistry*; 43: 93–100 (1978); J. Lehto et al.; *J. Chem. Soc. Dalton Trans.*, 101–103 (1989); and S. P. Mishra et al.: *J. Radioanalytical and Nuclear Chemistry, Articles*; 162:2, 299–305 (1992).

Various types of sodium titanates are described in the prior art as well as various uses for sodium titanates as an ion exchanger for ions besides strontium. M. Watanabe; *Journal of Solid State Chemistry*, 36: 91–96 (1981) describes the preparation of sodium titanate compounds from hydrothermal reactions involving $TiO_2$ with NaOH. The titanates described were $TiO_2$, $Na_2OnTi_2Na_xTiO_2$. J. Akimoto et al., Journal of Solid State Chemistry, 90: 147–154 (1991) describes the synthesis of monosodium titanates $NaTi_8O_{13}$, which are distinct from the sodium nonatitanates disclosed here. H. Leinonen et al., *Reactive Polymers*, 23: 221–228 (1994) describes the use of sodium titanates as ion exchangers for nickel and zinc.

Lehto et al.; *Radiochem. Radioanal. Letters*, 50:6, 375–384 (1982) describes the effects of gamma radiation on sodium titanate and other solid ion exchangers. The study concluded that gamma radiation had very little impact on the strontium ion exchange capacity of sodium titanate.

PCT Application WO 94/19277 discloses silico-titanates and methods for making and using them. The silico-titanates disclosed are useful for removing cesium from radioactive wastes. U.S. Pat. No. 4,156,646 discloses removal of plutonium and americium from aqueous alkaline waste solutions using sodium titanate ion exchangers. The sodium titanate used is a monosodium titanate. U.S. Pat, No. 5,352,644 describes a titania bound zeolite made by combining the zeolite, a low acidity titania binder material, and an aqueous slurry of titanium oxide hydrate.

SUMMARY OF THE INVENTION

An object of this invention is a novel titania bound ion exchange composition that has good physical strength.

Another object of this invention is a titania bound ion crystalline sodium titanate ion exchange composition wherein the ion exchange capacity of the titania bound crystalline sodium titanate is not degraded by the binder.

Yet another object of this invention is a titania bound ion exchange composition that is resistant to highly alkaline solutions.

Still another object of this invention is a titania bound ion exchange composition that is resistant to radioactive solutions.

Still another object of this invention is a titania bound crystalline sodium titanate ion exchange composition in which the binder enhances the ion exchange properties of the bound crystalline sodium titanate.

In one embodiment, this invention is an ion exchange composition of matter comprising crystalline sodium titanate and a hydrolyzable titanium compound.

In another embodiment, this invention is a titania bound ion exchange composition of matter comprising from about 40 to about 95 weight percent crystalline sodium titanate and from about 5 to about 60 weight percent titania binder having a strontium $K_d$ of at least 20,000.

In yet another embodiment, this invention is a method of manufacturing an titania bound ion exchange composition of matter. The method comprises admixing a hydrolyzed titanium compound having the formula Ti $XX_IX_{II}X_{III}$ wherein X is any constituent, and $X_I$, $X_{II}$, and $X_{III}$ are each chosen from the group consisting of Cl, Br, I, or OR where R is any acyl or alkyl group containing between 1 and 9 carbons and wherein R may make one or two points of contact with Ti via the oxygen with a crystalline sodium titanate and with methanol to give a wet titania bound ion exchange composition. The wet titania bound ion exchange composition is dried to give a dried titania bound ion exchange composition. The dried titania bound ion exchange composition is then compacted to a piece density of from 1.5 to 2.5 g/ml to give a compacted titania bound ion exchange composition. Finally, the compacted titania bound ion exchange composition is calcined at a temperature of from about 200° C. to about 500° C. for a period of time ranging from about 30 minutes to about 5 hours or more to give a calcined titania bound ion exchange composition.

In still another embodiment, this invention is a method of manufacturing a sodium titanate bound crystalline sodium titanate composition of matter comprising preparing a wet ion exchange composition by admixing crystalline sodium titanate having the formula $Na_{3.4-4.4}Ti_{8.4-9.2}O_{18.5-20.6}$ with titanium isopropoxide and methanol to give a wet titania bound ion exchange composition. The wet titania bound ion exchange composition is dried in air to give a dried titania bound ion exchange composition. The dried titania bound ion exchange composition is ground to give a powdered titania bound ion exchange composition and the powdered titania bound ion exchange composition is compacted to give a compacted titania bound ion exchange composition having a piece density of from 1.8 to 2.2 g/ml. Finally, the compacted titania bound ion exchange composition is calcined at a temperature of from about 200° C. To about 500° C. for a period of time ranging from about 30 minutes to about 5 hours or more.

In yet another embodiment, this invention is an titania bound ion exchange composition of matter comprising from about 40 to about 95 weight percent crystalline sodium titanate and from about 5 to about 60 weight percent titania binder and preferably a titania bound ion exchange composition wherein the crystalline sodium titanate has the formula $Na_4Ti_9O_{20}$.

DESCRIPTION THE DRAWINGS

There is shown in the drawings a presently preferred embodiments of the layered partially crystalline sodium titanate of this invention wherein.

Figure 11:
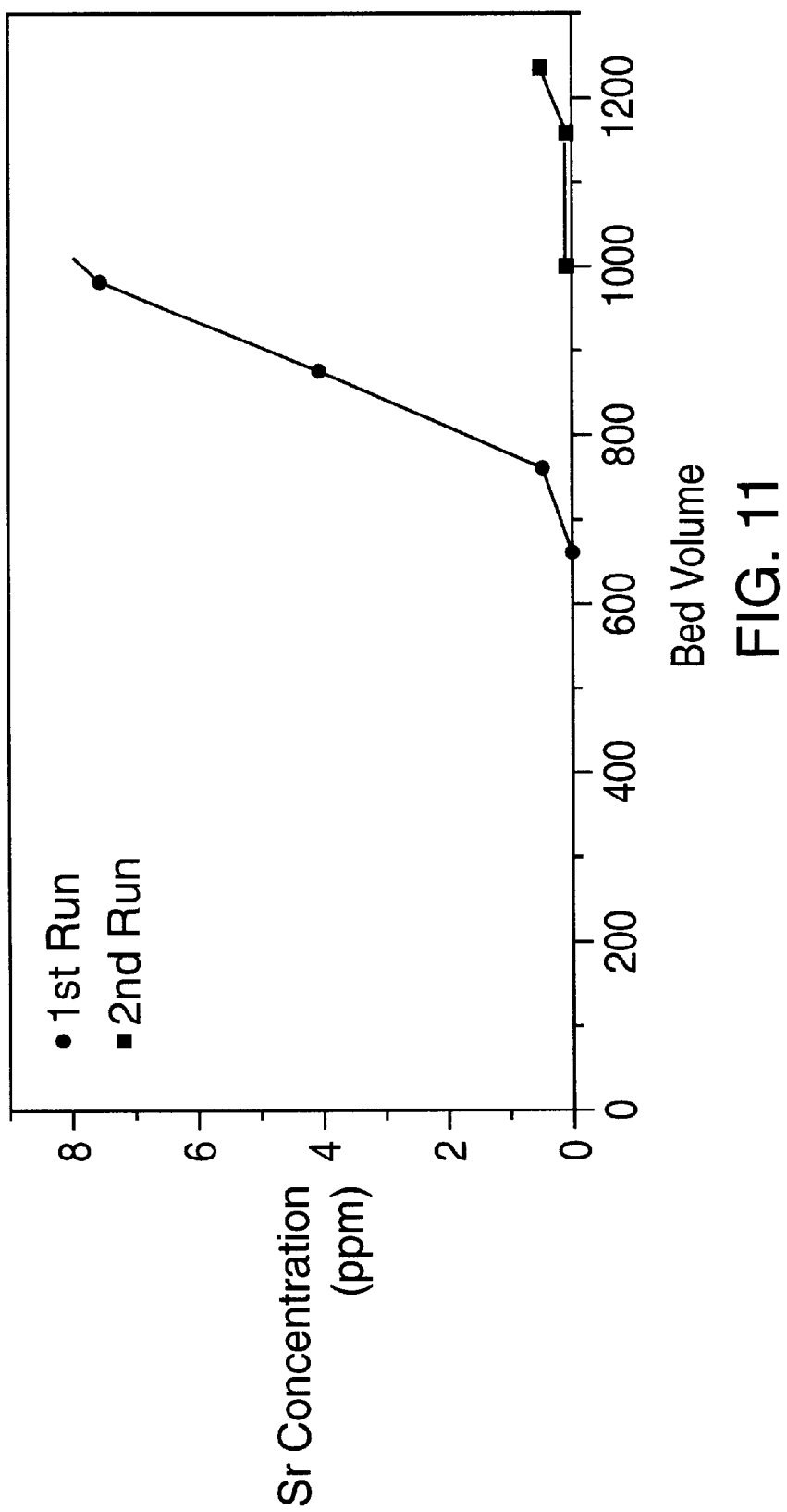
Figure 12:
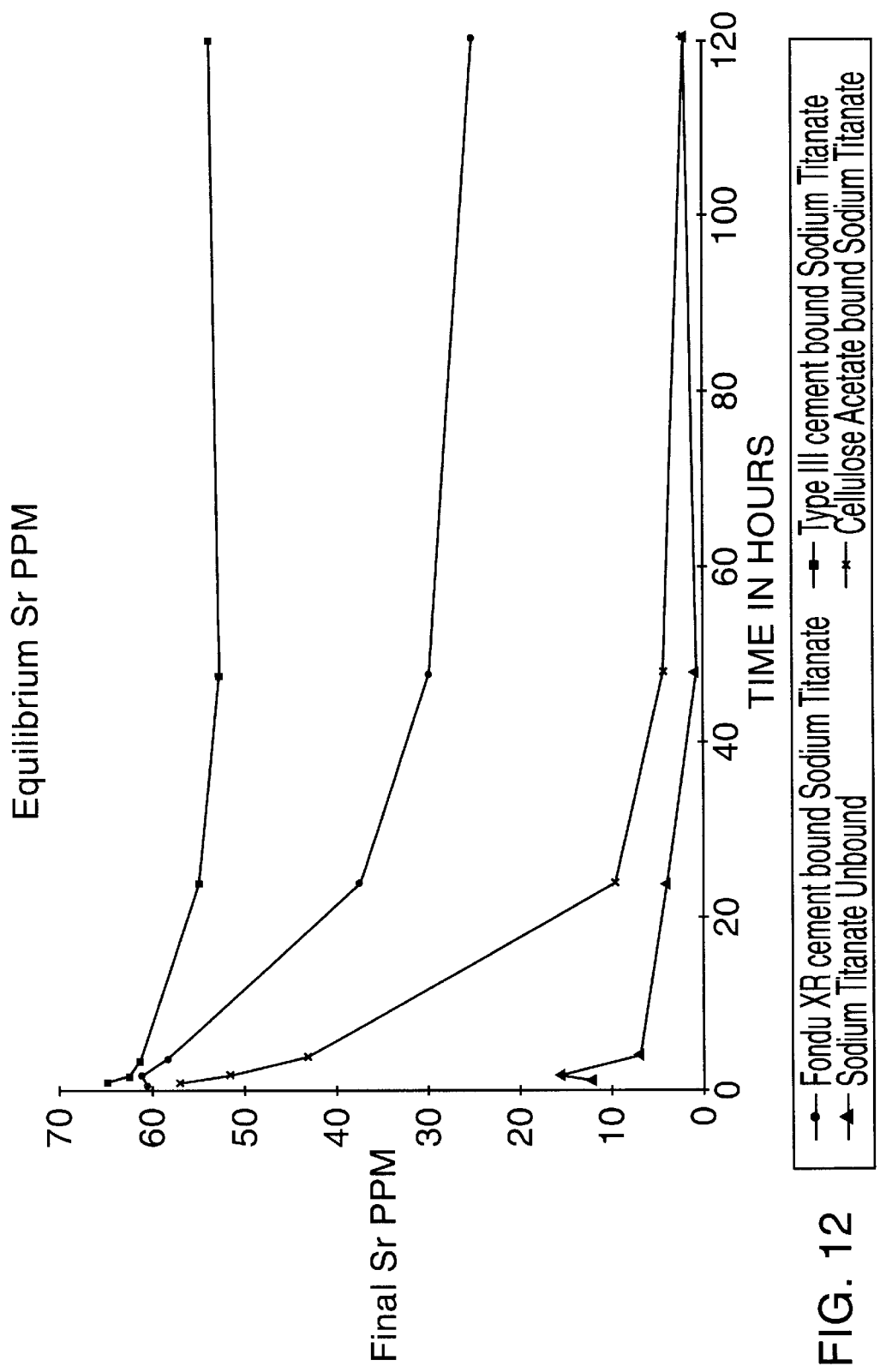

FIGS. 10A, 10B, 10C, and 10D are scanning electron micrographs (SEM) of each hydrothermally treated pilot plant batch of partially crystalline layered sodium titanate prepared in Example 5 magnified 3000 times;

FIG. 11 is a plot of the concentration of strontium in the effluent of a partially crystalline layered sodium titanate packed column over time before and after regeneration of the sodium titanate ion exchange material; and FIG. 12 is a plot of the kinetics of strontium uptake by bound and unbound partially crystalline layered sodium titanate of this invention.

DESCRIPTION OF THE PREFERRED EMBODIMENTS

The present invention relates to a partially crystalline layered sodium titanate having a d-spacing of from about 8 to about 9.9 angstroms, and a 001 reflection peak half width of from 1° to about 4.5°. The new partially crystalline sodium titanate has strong ion exchange properties towards strontium as a result of physical properties that distinguish the composition from all other sodium titanates.

The partially crystalline layered sodium titanate of this invention has the formula $Na_{3.4-4.4}Ti_{8.4-9.2}O_{18.5-20.6} \cdot xH_2O$. It is preferred that the partially crystalline layered sodium titanate has the formula $Na_4Ti_9O_{20} \cdot xH_2O$.

The non-crystalline layered sodium titanate of this invention also comprises amorphous sodium titanate. As will be discussed below, the combination of the layered partially crystalline sodium titanate and amorphous sodium titanate is the result of hydrothermally treating sodium titanate gel at specified conditions. The resulting partially crystalline layered sodium titanate has a unique X-ray diffraction pattern as well as other unique physical and performance characteristics.

The partially crystalline layered sodium titanate of this invention has been formulated to maximize its strontium ion exchange capacity and selectivity. The strontium ion-exchange property has been deliberately manufactured into the sodium titanate of this invention by controlling the sodium titanate hydrothermal treatment step to produce a sodium titanate product that it is partially crystalline. The hydrothermal treatment variables that affect the crystallinity of the sodium titanate product and, thereby, its strontium ion-exchange capacity and selectivity are, hydrothermal treatment temperature, the time of treatment, and the concentration of sodium hydroxide used in the hydrothermal treating solution. An additional advantage of the hydrothermal treatment is that it renders the sodium titanate essentially insoluble in strongly alkaline solutions.

Various methods are used to prepare a sodium titanate gel for hydrothermal treatment. Two methods: the reflux method; and the sol-gel method are described in more detail in the examples. The method used to prepare sodium titanate gel does not significantly affect the strontium ion-exchange properties of the final sodium titanate product.

Strontium ion-exchange affinity is measured by the strontium distribution coefficient, $K_d$. The distribution coefficient, $K_d$ is calculated using the following equation:

$$K_d = \frac{(C_i - C_f)}{C_f} \times \frac{V}{W}$$

where $C_i$ and $C_f$ are the initial and final solution concentrations of strontium or any other solution ion being tested, V is the volume of the starting test solution, and W is the weight of the sample tested. $K_d$ is typically reported in units of mL/g. The strontium $K_d$ is determined by contacting a known sample of sodium titanate with a solution of known strontium concentration for a controlled period of time, preferably 24 hours. Strontium $K_d$ is solution specific and for most $K_d$'s reported herein, a solution consisting of 5M $NaNO_3/0.1M$ NaOH/55 ppm Sr was used. If a reported $K_d$ is derived from different strontium containing solution, then the solution composition is reported. Strontium $K_d$ is also sample size specific and unless otherwise reported, each test used 20 mL of solution and 20 mg of solid sample (V/M= 100 mL/g).

We have discovered that the strontium $K_d$ of sodium titanate is a function of sodium titanate crystallinity. If the sodium titanate product is too crystalline, mass transfer into the sodium titanate will be slowed thereby lowering the strontium $K_d$. Likewise, if the sodium titanate is not crystalline enough, the sodium titanate will not have the requisite d-spacing to be a good strontium exchanger and the strontium $K_d$ will be low. Thus the sodium titanate of this invention is characterized as "partially crystalline"—the crystallinity of the sodium titanate of this invention is tailored during the hydrothermal treatment step to control d-spacing and other physical properties, thereby maximizing the strontium $K_d$ of the partially crystalline sodium titanate composition.

At least three physical properties are characteristic of a partially crystalline layered sodium titanate composition of this invention with the required crystallinity to be a good strontium ion exchanger. The properties are, strontium $K_d$, X-ray diffraction d-spacing, and the 001 reflection peak half width. The latter two properties are derived from the X-ray diffraction pattern of the partially crystalline layered sodium titanate composition of this invention.

The relationship between d-spacing and the X-ray angle of reflection is set forth in Bragg's Law:

$$2d \sin \theta = n\lambda$$

Where d is the d-spacing in angstroms, n is an integer, $\lambda$ is the X-ray wavelength in angstroms and $\theta$ is the X-ray angle of reflection in degrees. The Bragg's Law Equation is a useful tool for interpreting X-ray diffraction patterns since the X-ray diffraction pattern is a trace of $2\theta$.

The spacing between the sodium titanate layers is ascertained from the x-ray diffraction pattern using Bragg's Law and is known as d-spacing. Sodium titanate is composed of layers of titanium and oxygen atoms separated by voids containing sodium ions and water. The d-spacing is the distance from one titanium or oxygen atom to the identical atom one crystal layer away. D-spacing is the thickness of one titanate layer and one void space. For optimum strontium ion exchange capacity, the sodium titanate of this invention must have a d-spacing of from 8 to 9.9 angstroms, and preferably a d-spacing of from about 9.0 to about 9.9 angstroms. A sodium titanate having the requisite d-spacing admits hydrated strontium, excludes hydrated sodium, and exhibits strontium $K_d$s in excess of 20,000 mL/g.

Our discovery of a sodium titanate having an optimum crystallinity for strontium ion-exchange derived from our efforts to understand how hydrothermal re-treatment of sodium titanate gels affects the crystallinity of the partially crystalline sodium titanate product. This led to our discovery that sodium nonatitanate has an optimum crystallinity for use as a strontium ion exchanger. The optimum crystallinity can be quantified by measuring the width of the 001 reflection peak at half of it's height (FWHM, units=degrees). The FWHM is inversely proportional to the crystallinity of the sodium titanate material meaning the greater the FWHM, the less crystalline the material is. High strontium $K_d$'s are obtained when the FWHM is greater than 1 degrees and less than about 4.5 degrees: 1.0 degrees<FWHM<4.5 degrees, and most preferably when the FWHM is greater than 2 degrees and less than about 4.5 degrees: 2.0 degrees<FWHM<4.5 degrees.

The layered structure of partially crystalline sodium titanate of this invention is the source of its ability to selectively exchange strontium. The partially crystalline sodium titanate composition contains spaces between the layers that are large enough to accept hydrated strontium ions. The layer spacing is small enough, however, to, exclude hydrated sodium and this prevents hydrated sodium from competing for ion-exchange sites with hydrated strontium.

Sodium titanate surface area is related to the rate at which an ion exchanges. The larger the surface area, the faster the strontium exchange rate. Typically, the greater the crystallinity of sodium nonatitanate the lower its surface area is. Thus, there is also a fine balance between crystallinity and exchange rate. A partially crystalline sodium titanate of this invention will have a surface area of from 25–200 $m^2$/g. It is preferred, however, that the partially crystalline sodium titanate of this invention has a surface area of from 60 to 110 $m^2$/g.

Partially crystalline layered sodium titanates of this invention can be prepared by at least two techniques; by the sol-gel technique, and by the reflux technique. Both techniques produce a sodium titanate gel that must undergo hydrothermal treatment which crystallizes at least a portion of the sodium titanate gel to give a partially crystalline layered sodium titanate of this invention. It is the parameters of the hydrothermal treatment parameters, including the NaOH concentration, that are important for producing a partially crystalline sodium titanate composition that has the desired $K_d$, d-spacing, and FWHM properties.

The sol-gel method for preparing a sodium titanate gel comprises combining titanium isopropoxide and methanol at a weight ratio of from 1:1 to about 1:100 to form a first reaction mixture. A second reaction mixture is prepared by combining NaOH and methanol in a weight ratio that allows the sodium hydroxide to dissolve completely in the methanol. The first reaction mixture is added to the second mixture to form an admixture and a third reaction mixture comprising water and methanol slowly added to the admixture to initiate gel formation. The final mixture is allowed to gel for a period of time ranging from about 15 minutes to about 2 hours or more. Preferably, the reactor is sealed and agitated at a high rate for a period of time of 30 minutes or longer to keep the sodium titanate gel fluid. The solvent and byproducts are then evaporated from the sodium titanate gel in a vacuum oven operated at from 40° C. to about 80° C. for a period of time ranging from about 2 hours to about 24 hours or more until most of the methanol solvent and reaction byproduct, isopropanol, is volatilized from the sodium titanate gel.

An alternative and preferred method for producing sodium titanate gel is the reflux method. The reflux method does not use methanol and only produces the corresponding isopropanol byproduct thereby reducing the amount of volatile fumes and wastes produced by the sodium titanate gel formation process as well as making solvent recovery easier and more energy efficient. The reflux process comprises first preparing a solution of sodium hydroxide by dissolving sodium hydroxide pellets in deionized water to give a first solution consisting of from about 10 molar to about 19.2 molar NaOH. Neat—99%—titanium isopropoxide (TiP) is then added slowly to the first solution until the mole ratio of Ti to Na in the mixture ranges from 1:1 to 1:10, and preferably from 1:5 to 1:9. The sodium hydroxide/titanium isopropoxide mixture is then refluxed for a period of time ranging from about 60 minutes to about 4 hours or more at a temperature of from 100–150° C. to form an amorphous sodium titanate gel.

The sodium titanate gel produced by either method must be hydrothermally treated in order to produce the partially crystalline layered sodium titanate of this invention. The hydrothermal treatment is accomplished in a reactor at a pressure ranging from about 45 to about 1000 psig and at a temperature ranging from about 100 to about 250° C. The sodium titanate gel is hydrothermally treated for a period of time ranging from about 1 hour to about 1 day or more.

As the hydrothermal treatment occurs, the autogenous pressure in the reactor vessel increases with increasing temperature. Therefore, the preferred average reactor pressure during hydrothermal treatment ranges from about 50 psig to about 350 psig depending on reaction temperature. The hydrothermal treatment may occur under alkaline conditions created by adding water or a sodium hydroxide solution to the sodium titanate gel before or after it is added to the hydrothermal treatment reactor or autoclave. The hydrothermal treatment step may be repeated at least once in order to increase the crystallinity of the partially crystalline sodium titanate.

To obtain a partially crystalline layered sodium titanate product that falls within the scope of this invention, the hydrothermal treatment step is preferably conducted for 1 to about 20 hours at 160–200° C. By reducing the temperature of the hydrothermal treatment from 200° C. to 160° C., the autogenous pressure is reduced from 247 to 90 psia, thereby making the process safer and requiring less expensive equipment. The time reduction from 20 hours to 5 greatly increases the overall productivity of the process.

In some instances, a partially crystalline sodium titanate will not be crystalline enough to have the physical properties of a partially crystalline layered sodium titanate of this invention. In this situation, the partially crystalline sodium titanate can be hydrothermally treated a second and possibly subsequent times at the conditions recited above in order to increase the crystallinity of the partially crystalline sodium titanate to the desired level.

Table 1, below, shows that the strontium $K_d$ of a partially crystalline layered sodium titanate can be improved in some cases by a second hydrothermal treatment. By closely controlling the hydrothermal treatment step parameter, we can obtain the optimal crystallinity for strontium uptake using one, two, or more hydrothermal treatment steps.

TABLE 1

The Effect of Two Hydrothermal Treatments on the Strontium $K_d$ of Sodium Titanate*

| 1st Hydrothermal Treatment | 2nd Hydrothermal Treatment | | $K_d$ at 24 hours |
|---|---|---|---|
| | Temperature ° C. | NaOH M | mL/g |
| 200° C./Water | — | — | 48,700 |
| 200° C./Water | 240 | 0 | 75,400 |
| 200° C./Water | 240 | 1 | 127,600 |

*All hydrothermally treated for 20 hours

The partially crystalline layered sodium titanate of this invention has the formula $Na_{3.4-4.4}Ti_{8.4-9.2}O_{18.5-20.6}$. The partially crystalline sodium titanate is removed from the reactor and washed with deionized water and filtered. The washed product is dried at a temperature from about 50° C. to about 100° C. for a period of time ranging from about 3 hours to about 2 days or more.

The amount of sodium hydroxide added to the sodium titanate gel can be a critical hydrothermal treatment parameters and must be closely controlled in order to produce a sodium titanate having an optimum crystallinity for strontium ion exchange. In order to manufacture a partially crystalline sodium titanate having a d-spacing of from about 8 to about 9.9 angstroms and a 001 reflection peak half-width greater than 1° and less than about 4.5°, the amount of sodium hydroxide added to the sodium titanate gel during hydrothermal treatment should range from about 0.0M to about 6M, and preferably from 0.50M to about 1.5M. The sodium titanate gel inherently is naturally contaminated with NaOH. So sodium hydroxide will become dissolved in any water added to the sodium titanate gel during gel hydrothermal treatment. It is preferred, however, that an aqueous solution of NaOH in the molarity ranges given above be added to the sodium titanate gel prior to hydrolysis.

The optimum hydrothermal treatment temperature is from about 100° C. to about 250° C. and preferably from 160–200° C. Finally, it is preferred that the strontium $K_d$ of the resulting partially crystalline sodium titanate is at least 20,000 mL/g based on 20 mL of solution consisting of 55 ppm Sr/SM $NaNO_3$/0.1M NaOH added to 200 mg of solid sample.

The partially crystalline sodium titanate of this invention is very useful when used as an ion exchanger. In order to use the powdered partially crystalline sodium titanate as an ion exchanger, it must be bound into larger particles to reduce the pressure drop in the ion exchange column and to ease handling. Any binder known in the art for binding catalysts and ion exchangers may be used. However, the bound sodium titanate of this invention is very useful in removing strontium and other radioactive waste from highly caustic aqueous solutions. So, it is preferred that the binder be selected from materials that withstand radiation and alkaline conditions, and the material should not inhibit or block strontium or other ions from entering the partially crystalline layered sodium titanate. A composite material made up from 40 to 95 wt % of partially crystalline sodium titanate with 5–60 wt % of a binder is preferred.

Both organic and inorganic binders can be mixed with partially crystalline sodium titanate to make a bound ion exchange composition for strontium. For applications with nuclear waste, inorganic binders offer the advantage of increased radiation resistance. For other applications, organic binders may be easier to extrude into pellets than inorganics.

Examples of inorganic binders include silica or silica gel, silicon carbide, clays, and silicates, including synthetically prepared and naturally occurring ones, which may or may not be acid treated, for example, attapulgus clay, china clay, diatomaceous earth, fuller's earth, kaolin, kieselguhr, etc.; ceramics, porcelain, crushed firebrick, bauxite; refractory inorganic oxides such as alumina, titanium dioxide, zirconium dioxide, chromium oxide, beryllium oxide, vanadium oxide, cerium oxide, hafnium oxide, zinc oxide, magnesia, boria, thoria, silica-alumina, silica-magnesia, chromia-alumina, alumina-boria, silica-zirconia, etc.; crystalline zeolitic aluminosilicates such as naturally occurring or synthetically prepared mordenite and/or faujasite, for example, either in the hydrogen form or in a form which has been exchanged with metal cations; spinels such as $MgAl_2O_4$, $AnAl_2O_4$, $CaAl_2O_4$, and other like compounds; and combinations of materials from one or more of these groups.

Other examples of inorganic binders include various metal salts in powder, sol, or gel form, as well as graphite and hydraulic cement may be used to bind any type of sodium titanate. In addition, Ciment Fondo XR calcium aluminate, and Portland type 3 cement are good sodium titanate binders with excellent strength and resistance to high alkalinity. When cements are used as binders, the bound sodium titanate can be in the form of pellets, can be fashioned with dies, or extruded.

Organic binders may also be used to bind partially crystalline sodium titanate. Examples of organic binders include polymers, starches, cellulose, cellulose acetate and other organic catalyst and ion-exchanger binders known in the art.

Pore formers, surface area enhancers and other materials may be added to the partially crystalline sodium titanate before, during, or after binding to improve the porosity and surface area of the bound crystalline sodium titanate. A preferred pore former is one which can be removed from the ion-exchanger chemically, or thermally before the bound material is used as an ion-exchanger.

A preferred binder is a hydrolyzable titanium compound. The hydrolyzable titanium compound is useful for binding any form of crystalline titanates including crystalline sodium titanates, crystalline hydrogen titanates, and the preferred partially crystalline sodium titanate. A hydrolyzable titanium compound of this invention will have the formula Ti $XX_IX_{II}X_{III}$ wherein x is any constituent, and $X_I, X_{II}$ and $X_{III}$ are each chosen from the group consisting of Cl, Br, I, or OR where R is any acyl or alkyl group containing between 1 and 9 carbons and wherein R may make one or two points of contact with Ti via oxygen.

While any hydrolyzable titanium compound fitting the description above will be effective as a binder under these conditions, preferred hydrolyzable titanium compounds will be those which are liquids within the temperature range of 0 degrees Centigrade to 60 degrees Centigrade, since this will allow easier mixing of the binder with the crystalline titanates. In addition, it is preferable that the hydrolyzable titanium, on hydrolysis, generate a non-hazardous byproduct which will not react with the titanate.

Preferred hydrolyzable titanium compounds include titanium alkoxides and especially those titanium alkoxides which are liquids within the temperature range of 0 degrees Centigrade to 60 degrees Centigrade. Examples of such titanium alkoxides are titanium ethoxide, titanium n-propoxide, titanium isopropoxide, titanium n-butoxide, titanium isobutoxide, titanium sec-butoxide, titanium tert-butoxide, and titanium 2-ethylhexyloxide. The most preferred titanium alkoxide is titanium isopropoxide. Examples of other hydrolyzable titanium compounds are titanium bis(2-ethylhexane-1,3-dialkoxide), titanium lactate, titanium malate, titanium tartrate, titanium citrate, and titanium acetylacetonate. The hydrolyzable titanium compound is preferably used to bind a form of crystalline sodium titanate that is a good strontium ion exchanger because the resulting titania binder has little detrimental impact on the strontium $K_d$ of the bound product. A preferred crystalline sodium titanate is a partially crystalline sodium titanate having the formula: $Na_{3.4-4.4}Ti_{8.4-9.2}O_{18.5-20.6}$, a d-spacing of from 8.0 to 9.9, and a (001) reflection peak half-width greater than 1° and less than about 4.5°.

The hydrolyzable titanium compound, preferably titanium isopropoxide, and a crystalline sodium titanate are combined and water from the air and from the crystalline sodium titanate slowly hydrolyze the hydrolyzable titanium compound to form a titania bound crystalline sodium titanate.

When the hydrolyzable titanium compound is a solid, the titania bound sodium titanate can be bound in the presence of a solvent. Preferably an alcohol, such as methanol, is used. When the hydrolyzable titanium compound is a liquid, solvent is not required to form the bound crystalline sodium titanate. The bound product may be dried before use or further processing, either at ambient conditions or in an oven. Optionally, the titania bound crystalline sodium titanate is dried in an oven at a temperature of from about 75° C. to about 100° C. for a period of time ranging from about 1 hour to about 12 hours or more. In a preferred method, the titania bound crystalline sodium titanate is dried under ambient conditions until the material has a slightly damp appearance.

The dried titania bound crystalline sodium titanate can be used as is, it can be ground and sieved into smaller particles for use as an ion exchanger, or it can be processed further to improve its mechanical properties. It is preferred that the dried titania bound crystalline sodium titanate is further processed first by compaction, and then by calcination. The dried titania bound crystalline sodium titanate can be compacted as produced, or it can be ground into small particles, or into a powder and then compacted. It is preferred that the dried titania bound crystalline sodium titanate is ground into smaller particles that can be easily compacted.

The titania bound crystalline sodium titanate may be compacted in any powder compaction equipment known such as molding presses, tableting presses, and extruders. Molding presses comprise a mechanically or hydraulically operated press and a two part mold attached to the platens of the press, consisting of top (male) and bottom (female) portions. The action of pressure and heat cause a particulate charge to flow and take the shape of the cavity of the mold.

Tableting presses produce simpler shapes at higher production rates than do molding presses. A single-punch press is one that will take one station of tools consisting of an upper punch, a lower punch, and a die. A rotary press employs a rotating round die table with multiple stations of punches and dies. Older rotary machines are single-sided; that is, there is one fill station and one compression station to produce one tablet per station at every revolution of the rotary head. Modern high-speed rotary presses are double-sided; that is, there are two feed and compression stations to produce two tablets per station at every revolution of the rotary head.

The titania bound crystalline sodium titanate may be dry granulated. In dry granulation, the blended dry ingredients are first densified in a heavy-duty rotary tableting press which produces pellets. The pellets are subsequently crushed into particles of the size required for ion exchange. Densification can also be accomplished using a rotary compactor-granulator system. A third technique, direct compaction, uses sophisticated devices to feed the blended dry ingredients directly to a high-speed rotary press.

Roll presses can also be used to tablet the titania bound crystalline sodium titanate by directing a powder feed into a gap between two rolls rotating at equal speeds. The size and shape of the compacted pellets are determined by the geometry of the roll surfaces. Pockets or indentations in the roll surfaces form briquettes from a few grams up to 5 lb. or more in weight. Smooth or corrugated rolls produce a solid sheet which can be granulated in the desired particle size on conventional grinding equipment.

Lubricants added to the powder feed can aid in the transmission of compaction forces and reduce sticking to the die surfaces. Lubricants that are removed from the bound material at calcining temperatures may be incorporated into the titania bound crystalline sodium titanate prior to compaction. Such lubricants may be selected from the group comprising boric acid, graphite, oils, soaps, starch, stearic acid, and waxes. A preferred lubricant is stearic acid and it is preferably present in the powder compactor feed in an amount ranging from about 0.1 to 4.0 weight percent.

The compaction step should produce a compact particle or pellet having a piece density ranging from about 1.5 to about 2.5 g/ml. It is most preferred that the compressed titania bound crystalline sodium titanate particle has a piece density ranging from 1.8 to 2.2 g/ml.

The compacted titania bound crystalline sodium titanate particles are calcined at a temperature ranging from about 150° C. to about 500° C. for a period of time ranging from 30 minutes to 10 hours or more. It is preferred that the particles are calcined in air at a temperature of from about 200° C. to about 400° C. for a period of time ranging from about 30 minutes to about 5 hours. It is most preferred that the particles are calcined in moist air at the conditions identified above.

Bound and unbound sodium titanate ion exchangers are useful in removing strontium and other radioactive and non-radioactive metals from aqueous solutions by packing bound or unbound sodium titanate into a column and removing target metals from the aqueous streams which are fed in to the column. Using this configuration, crystalline sodium titanate can remove metals from large volumes of aqueous solutions. Sodium titanate ion-exchangers can also be regenerated with an acid, and reused without loss of performance. Furthermore, bound crystalline sodium titanate is able to remove strontium from aqueous streams having a pH of at least 9.95 up to 13 or more, and a Na ion molarity of from about 1.0 to about 5.0 or more without significant loss of exchanger capacity or physical integrity.

When used in processing nuclear waste, the ion-exchange columns should be made out of glass, and may be lined with a polymer for caustic protection. Once the exchanger is spent, the sodium titanate, along with the glass column can be vitrified to act as a impervious barrier for the radioactive strontium.

The unbound and bound sodium titanate of this invention is useful as an ion exchanger for metals besides strontium. Specifically, the sodium titanate is useful, either alone or bound, in removing actinides, and especially uranium, from aqueous solutions. Other actinides which can be similarly removed include thorium, plutonium and americium.

Sodium titanate may be used as an ion-exchanger as produced or it may be converted into H-titanate and used as an ion-exchanger for metals such as ytterbium, zirconium, molybdenum, silver, thallium, lead, chromium, vanadium, iron, cesium, tin, arsenic, and other metal ions with a high affinity towards hydrogen titanate.

The sodium titanate of this invention is also useful either alone or with a binder, to exchange a wide variety of metals at alkaline conditions. The metals are ranked according to uptake in Table 2 below. For example, lithium, magnesium, nickel, cobalt, and barium are exchanged by a partially crystalline sodium titanate in amounts equal to or greater than strontium. Among the priority pollutants, partially crystalline sodium titanate has a high affinity for zinc, copper, cadmium, mercury, thallium, and lead. Among the precious metals tested, silver has a very high uptake by sodium titanate. As seen in Table 2, these results indicate that sodium titanate can be used to remove metals from industrial effluent and other aqueous metal containing waste, as well as recover target materials.

The ion exchange results reported in Table 2 are based on batch tests using 200 mg sodium titanate, (sample 5-1 from Example 5, infra) an aqueous 20 mL solution containing 20 ppm of the metal ions being screened, at alkaline conditions (pH 10–11). Sodium was present in all samples, and the results reflect high selectivities for the indicated metals over sodium. Sodium titanate is useful only as a cation exchanger, and therefore it did a poor job exchanging some metals, including As, Sb, Mo, and Pb at high pH.

TABLE 2

Metals Affinity for Sodium Titanate. Conditions: initial metal ~20 ppm, final pH 9.95–11.14.

| Target Metal | $K_d$ mL/g | Industries where metal is present in effluent |
|---|---|---|
| Lithium | >19900 | Nuclear, Military |
| Magnesium | 14900 | Mining Paint |
| Nickel (II) | >7400 | Electroplating, Explosives, Foundry, Wood, Tanning, Mining, Paint, Petroleum, Enameling, Paper, Textiles |
| Cobalt (II) | 6900 | Mining, Paint, Enameling |
| Barium | 6570 | Paint |
| Strontium | 6570 | Mining, Nuclear |
| Zinc | 5570 | Electroplating, Explosives, Foundry, Wood, Tanning, Mining, Paint, Enameling, Paper, Textiles |
| Silver | 5150 | Electroplating, Explosives, Foundry, Wood, Mining, Paint, Petroleum, Textiles |
| Copper (II) | 2900 | Electroplating, Explosives, Foundry, Wood, Tanning, Mining, Paint, Petroleum, Enameling, Paper, Textiles |
| Cadmium | 2120 | Electroplating, Foundry, Wood, Mining, Paint, Petroleum, Enameling, Textiles |
| Calcium | 1900 | Mining, Paint |
| Mercury (II) | >1800 | Foundry, Wood, Mining, Paint, Petroleum, Enameling, Paper, Textiles |
| Thallium (I) | >1800 | Wood, Mining, Paint, Petroleum, Textiles |
| Lead (II) | 1700 | Electroplating, Explosives, Foundry, Wood, Tanning, Paint, Petroleum, Enameling, Paper, Textiles |
| Ytterbium (III) | 1400 | Nuclear |
| Manganese (II) | 1030 | Mining, Paint, Enameling |
| Rubidium | 658 | Nuclear |
| Cesium** | 492 | Nuclear |
| Tin (II) | 217 | Electroplating, Paint, Enameling |
| Chromium (III) | 92 | Electroplating, Foundry, Wood, Tanning, Mining, Paint, Petroleum, Enameling, Paper, Textiles |
| Antimony (V) | 87 | Explosives, Foundry, Wood, Mining, Paint, Petroleum, Enameling, Textiles |
| Aluminum | 69 | Mining, Paint, Enameling |
| Vanadium (V) | 33 | Mining, Paint |
| Iron (III) | 33 | Electroplating, Mining, Paint, Enameling |
| Zirconium | 17 | |
| Arsenic (V) | 0 | Foundry, Wood, Mining, Paint, Petroleum, Enameling, Textiles, Mining, Paint, Enameling |
| Molybdenum (VI) | 0 | |

**Initial [CS] = 43 ppm

EXAMPLE 1

A reflux method for manufacturing sodium titanate gel of this invention followed by hydrothermal treatment to produce a partially crystalline sodium titanate, is described.

5.85 g of NaOH pellets were dissolved in 14 mL of distilled deionized water (DDI). 32 mL of titanium isopropoxide (TiP) was then added slowly to the NaOH solution. This mixture was then refluxed for 3 hrs at which time it was then transferred into a Teflon lined bomb using distilled deionized water (except for Sample 1-2 which used 20 mL of 0.82M NaOH solution). The bomb was sealed and placed in a 190° C. oven and allowed to react for 20 hrs. The material was collected by filtration and washed one time with DDI and three times with methanol. The initial Ti concentration in the bomb was 1.58M and the initial concentration of NaOH in the bomb was 2.46M. The Ti:Na ratio was 1:1.56.

Table 3 lists the properties of partially crystalline sodium titanates prepared by the method of this Example. The solution used to derive the strontium $K_d$ data included 5M NaNO$_3$, 0.1M NaOH and 90–95 ppm Sr$^{2+}$. The solution to sample weight ratio was 200:1 unless otherwise reported.

TABLE 3

Sodium Titanates Prepared by Method of Example I

| Sample | Ti M | NaOH M | Ti:Na Mole ratio | Reflux time (hrs) | Hydrothermal Temp. (time) | Sr K$^d$ (mL/g) |
|---|---|---|---|---|---|---|
| 1-1 | 1.1 | 1.5 | 1:1.37 | 3.25 | 200 (20 h) | 3,180 |
| 1-2 | 1.6 | 2.5 | 1:1.56 | 3 | 190 (20 h) | 11,800* |
| 1-3 | 1.0 | 2.0 | 1:2 | 3 | 200 (20 h) | 5,340 |
| 1-4 | 1.0 | 4.0 | 1:4 | 3 | 200 (20 h) | 19,900 |
| 1-5 | 0.63 | 3.1 | 1:5 | 2 | 170 (22.5 h) | ≧95,000 |
| 1-6 | 0.65 | 4.5 | 1:6.9 | 3.2 | 193 (19.7 h) | ≧95,000 |
| 1-7 | 0.58 | 5.1 | 1:8.9 | 3.2 | 193 (19.7 h) | ≧95,000 |
| 1-8 | 0.90 | 9.0 | 1:10 | 3.2 | 190 (21 h) | — |
| 1-9 | 0.44 | 8.35 | 1:19.4 | 16.5 | 200 (1 d) | — |
| 1-10 | 0.75 | 5.1 | 1:6.8 | 1 hr | 200 (4 d) | 42,800 |
| 1-11 | 0.43 | 0.87 | 1:2 | 3.5 | 145 (4 d) | 602** |
| 1-12 | 0.69 | 1.4 | 1:2.1 | 3 | 200 (7 d) | 710* |
| 1-13 | gel | gel | 1:1.37 | NA | 200 (1 d) | +3,360* |

*The solution to sample v/w ratio was 250:1.
**The solution to sample v/w ratio was 400:1.

Figure 2:
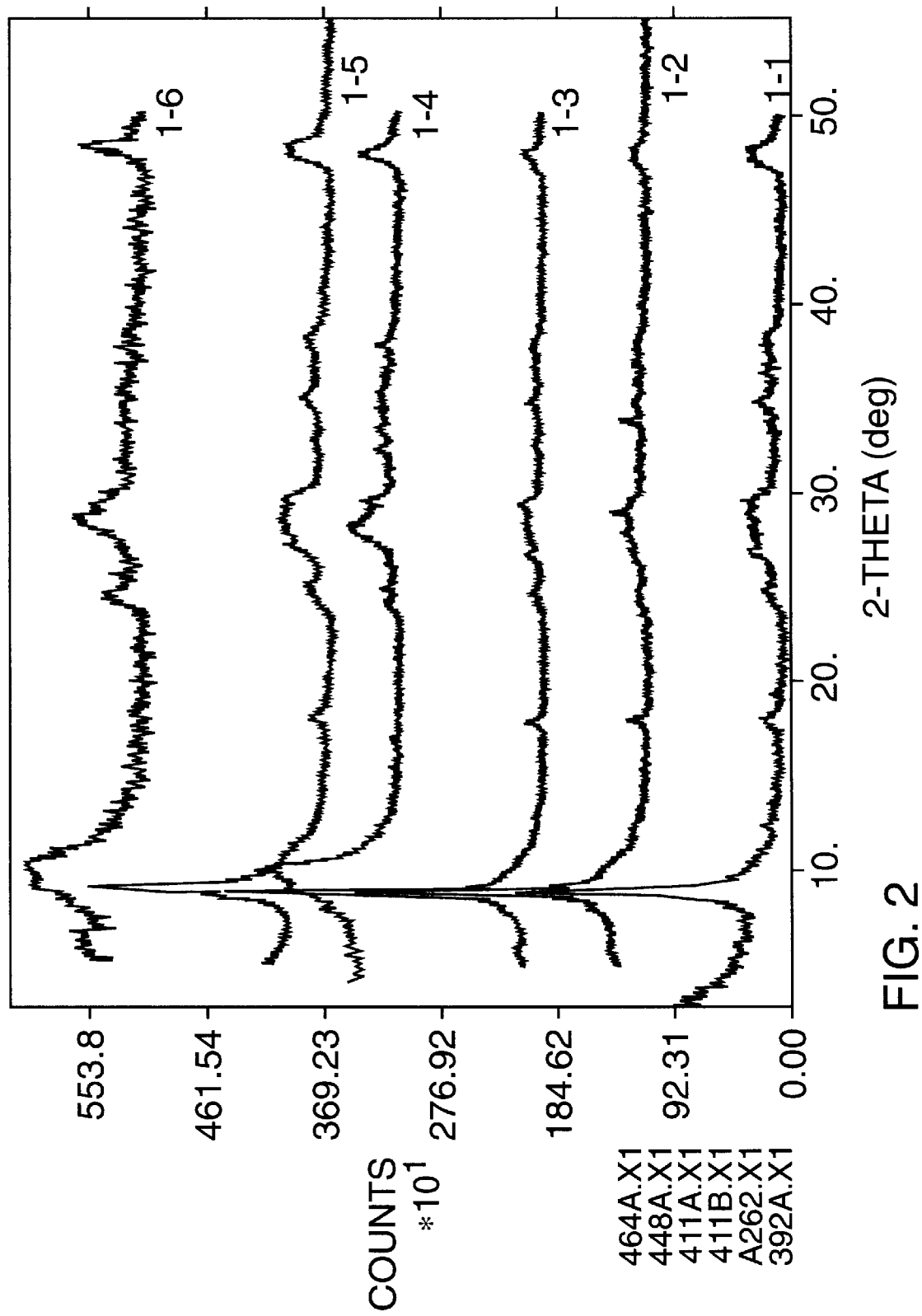
FIG. 2 are X-ray diffraction patterns of partially crystalline layered sodium titanate samples 1-1 to 1-6 as prepared in Example 1.
Figure 3:
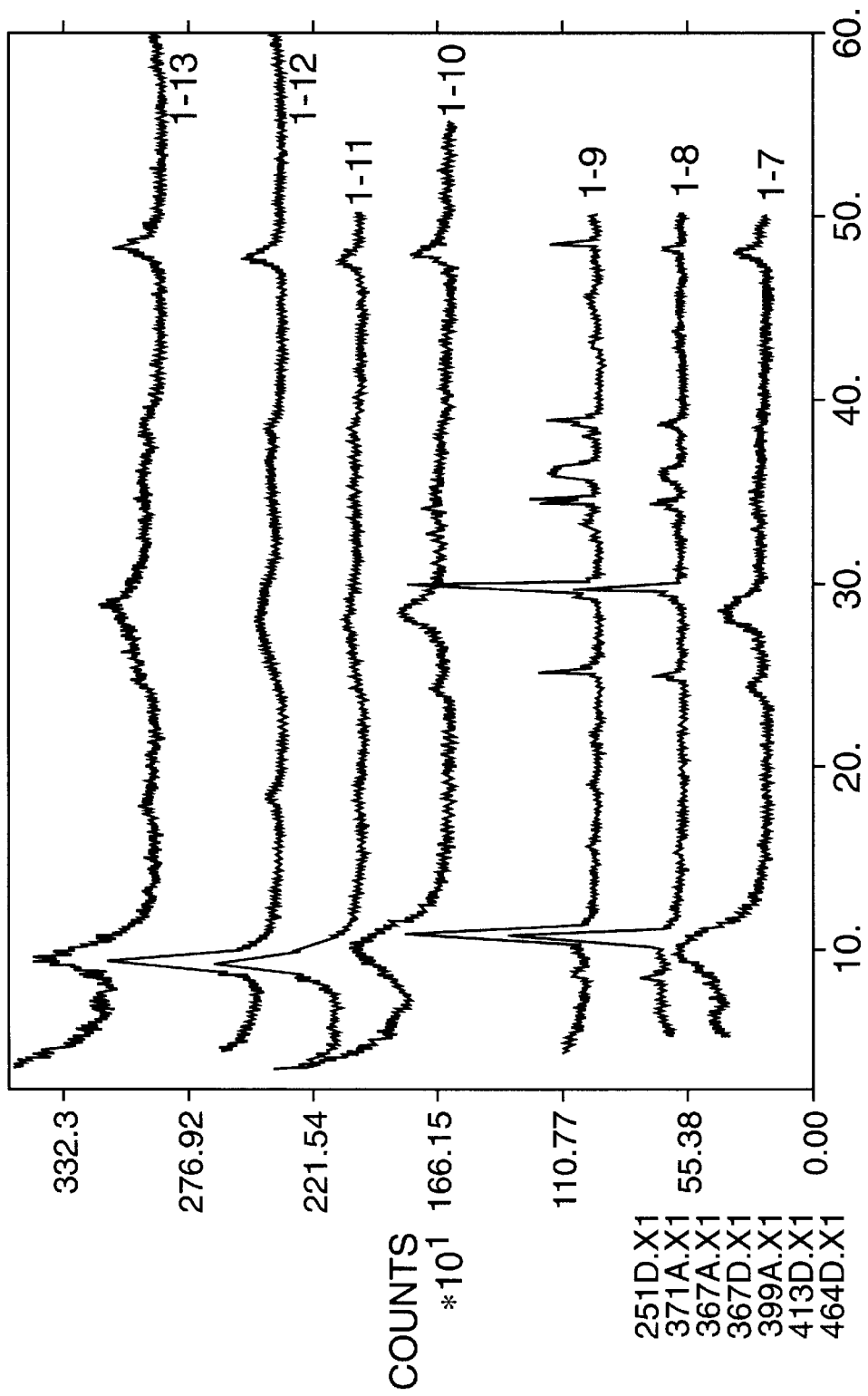
FIG. 3 are X-ray diffraction patterns of partially crystalline layered samples 1-7 to 1-13 as prepared in Example 1.

The XRD patterns of samples 1-1 to 1-13 are shown in FIGS. 2 and 3. Samples 1-6, 1-7, and 1-10 each have d-spacing below 9.9 and greater that 8.0 and 001 reflection FWHM's of between 1° and 4.5°.

EXAMPLE 2

Figure 4:
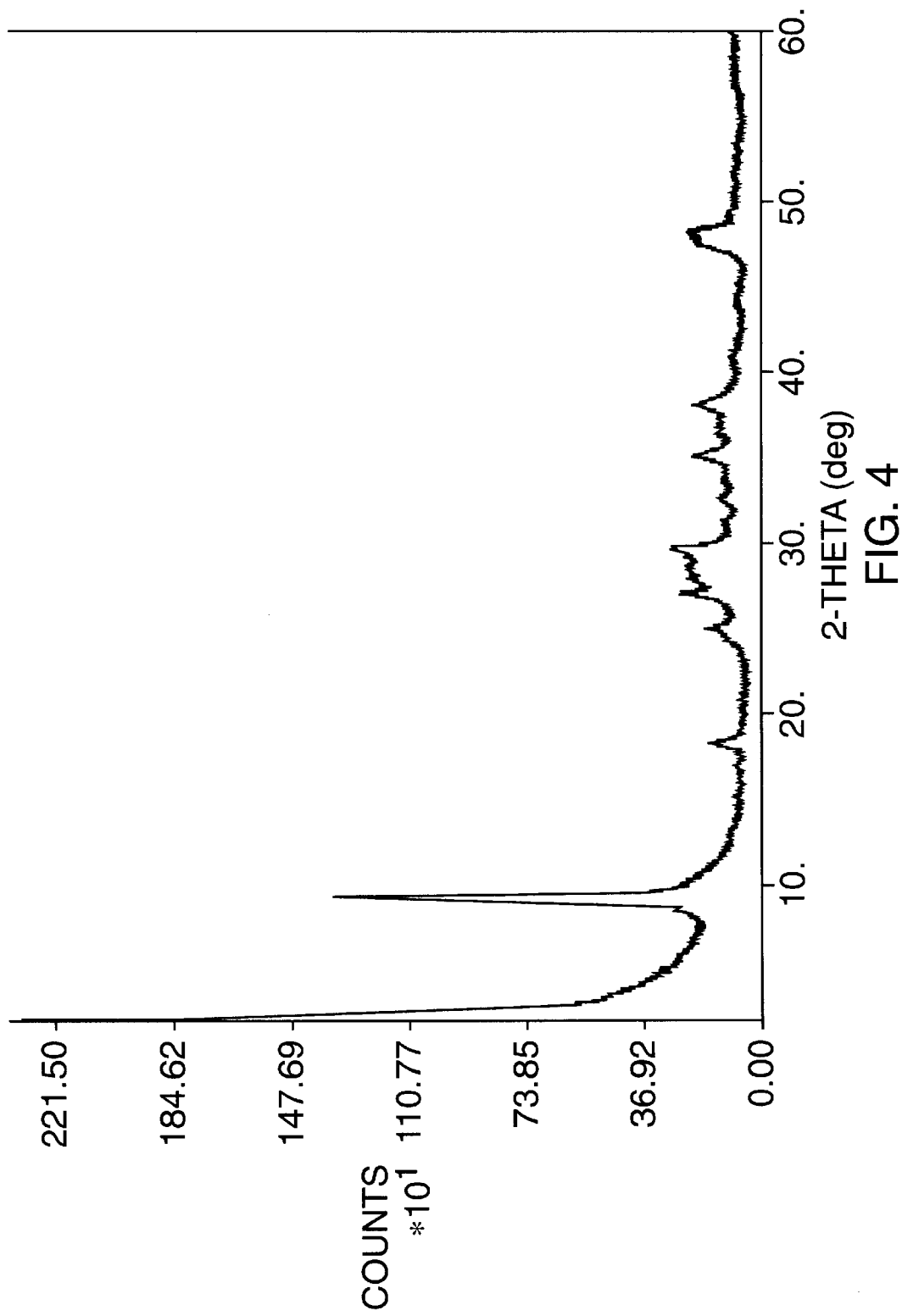
FIG. 4 is an X-ray diffraction pattern of partially crystalline layered sodium titanate sample 2-1 prepared in Example 2.

Sample 1-2 of Example 1 was subjected to a second hydrothermal treatment by placing 3.50 g of the sample into a Teflon lined bomb. 38 mL of 4.2M NaOH solution was added to the solid. This mixture was then treated hydrothermally for 2 days at 170° C. The sample was (designated 2-1) collected by filtration and washed one time with DDI, four times with methanol, and two times with ethanol. The X-ray diffraction pattern of sample 2-1 is found in FIG. 4.

As seen in Table 5, the $K_d$ before the second hydrothermal treatment (sample 1-5) was 3,060 mL/g and after the additional hydrothermal treatment (sample 2-1), 1270 mL/g.

EXAMPLE 3

The preparation of a partially crystalline layered sodium titanate by the sol-gel method is described.

Solution B was made in a plastic beaker by dissolving 40.793 g of 98.4% NaOH pellets in 400 mL of methanol. The NaOH is not readily soluble in methanol. Therefore, the mixture was stirred for over 30 minutes with a magnetic stirrer.

Solution A was made by mixing 294.2 g of titanium isopropoxide (TiP) and 250 mL of methanol in the reaction vessel. The heat of mixing is exothermic (the temperature reached 72° C.). The reaction vessel was a 2-liter glass beaker wrapped with insulation tape. Next, solution B was slowly added to solution A in the reaction vessel. The contents were stirred with a magnetic stirrer, and heated to 53° C. on a hot plate.

Solution C was made in a 100 mL beaker by mixing 20 mL water and 50 mL methanol. Using a buret, solution C was added drop-wise to the heated mixture of A and B (53° C.). The resulting sodium titanate gel was mixed for another 15 minutes, then transferred to a ceramic evaporating dish. The solvents were allowed to evaporate overnight in a hood. Next, about half the gel was loaded into a liter round bottom flask, which was then connected to a rotary evaporator. The gel was dried under vacuum for 1.5 hours at 60–75° C. The rotary evaporation procedure was repeated for the second batch. This procedure yielded 135 g of dried gel.

To make the final sodium titanate product, 20 g of the precursor gel was mixed with either 40 mL of deionized water, or 40 mL of 1M NaOH in a Teflon lined Parr autoclave. The contents were then hydrothermally treated at 160–200° C. for 5–20 hours.

EXAMPLE 4

The preparation of a partially crystalline sodium titanate using the reflux method followed by hydrothermal treatment is described.

A 30% NaOH solution was prepared by dissolving 419.88 g of 98.4% NaOH pellets in 956 g of deionized water. This solution was transferred into a 3000 mL, 3-necked round bottom reaction flask. 295.3 g of titanium isopropoxide (TiP) was added drop-wise from a 500 mL addition funnel into the NaOH solution in the reaction flask. During the addition, the mixture was stirred at 500 rpm. A large amount of white solids precipitated out of solution.

The reaction vessel was placed on a heating mantle, and equipped with a condenser, thermocouple and temperature controller, and mixer. The mixture was stirred at 250 rpm and refluxed at 110° C. for 5.25 hours. The sodium titanate gel product was allowed to cool and settle out overnight. The water was then decanted, and the solids dried at 60° C. for 2 days. The yield was 152 g of sodium titanate gel.

To make the final product, 20 g of the precursor was mixed with either 40 mL of deionized water, or 40 mL of 1 M NaOH in the Teflon lined Parr autoclave. The contents were then hydrothermally treated at 160–200° C. for 5–20 hours.

EXAMPLE 5

10 kg of sodium titanate gel were made using the sol gel method. A 50 gallon reactor was charged with 30 kg titanium isopropoxide and 20.6 kg methanol. To this mixture, a solution of 4.2 kg NaOH and 32.8 kg methanol was slowly added from one of several 20 gallon mixing tanks. A 2.1 kg water/4.1 kg methanol solution was then slowly added to initiate gel formation. Methanol evaporation from the reactor was eliminated by applying pressure, and high agitation rate, (681 ft/min), to keep the gel fluid. This meant that after a gelation period of 30 minutes, the gel flowed freely from the reactor. The gel was emptied onto trays which were placed in a 60° C. vacuum oven at 27 in. Hg for 12 hours. Methanol solvent (about 56 kg), and byproduct isopropanol (about 21 kg) were evaporated from the product in the oven.

The dried gel was divided into four batches and treated hydrothermally in a 5 gallon stainless steel-lined autoclave. The autoclave liner was capped with a sheet of Teflon. Table 4, below, summarizes the conditions of each hydrothermal treatment. For each of batches 5-1 and 5-2, 4.5 kg of dry gel was hydrothermally treated in 9 kg of water for 20 hours at 160–200° C. For batches 5-3 and 5-4, 2.6 kg of dry gel was treated in 5.2 kg of water for 5 hours at 160–200° C. All non-stirred batches formed a solid chunk by the end of the autoclave step. This solid was easily dispersible in water. Batch 5-4 was agitated throughout the treatment. The material from batch 5-4 was a finely suspended slurry, and therefore was very easy to remove from the autoclave.

The top layer of water on each batch in the autoclave was suctioned off and the remaining solid slurry was transferred to a filter bag within a centrifuge. 7 kg of deionized water was used to wash the solids clinging to the sides of the autoclave. The solids were centrifuged for 10 minutes to remove the water. An additional 4 kg of water was added to the solids and then centrifuged to wash the product. The product was dried overnight in a 65° C. oven with a flowing nitrogen purge. The combined yield of all four batches was 9.2 kg of partially crystalline sodium titanate.

described. The distribution coefficient as defined in this example is the ratio of the concentration $Sr^{2+}$ in the exchanger to the concentration of $Sr^{2+}$ in solution at equilibrium. Because the analyses were carried out on a weight basis, the units are g/g instead of the usual mL/g. The distribution coefficients ($K_d$) were determined for $Sr^{2+}$ as a

TABLE 4

| Batch | Time (hr) Heat Up & Cool Down | At Temp* | Internal Temperature ° C.** high | Ave | Internal Pressure (psig) Range | Ave | Mixer | Dried Gel Charged (kg) | Yield of Final Product (kg) |
|---|---|---|---|---|---|---|---|---|---|
| 5-1 | 26 | 20 | 200 | 200 | 140–310 | 275 | off | 4.50 | 2.37 |
| 5-2 | 20 | 20 | 200 | 198 | 190–305 | 285 | off | 4.50 | 3.98 |
| 5-3 | 15 | 5 | 200 | 199 | 155–330 | 300 | off | 2.60 | 1.61 |
| 5-4 | 13 | 5 | 210 | 205 | 150–372 | 350 | on | 2.60 | 1.23 |

*At time = at temperature between 160–200° C.
**Internal temperature high and average during when the autoclave was at temperature.

EXAMPLE 6

Figure 1:
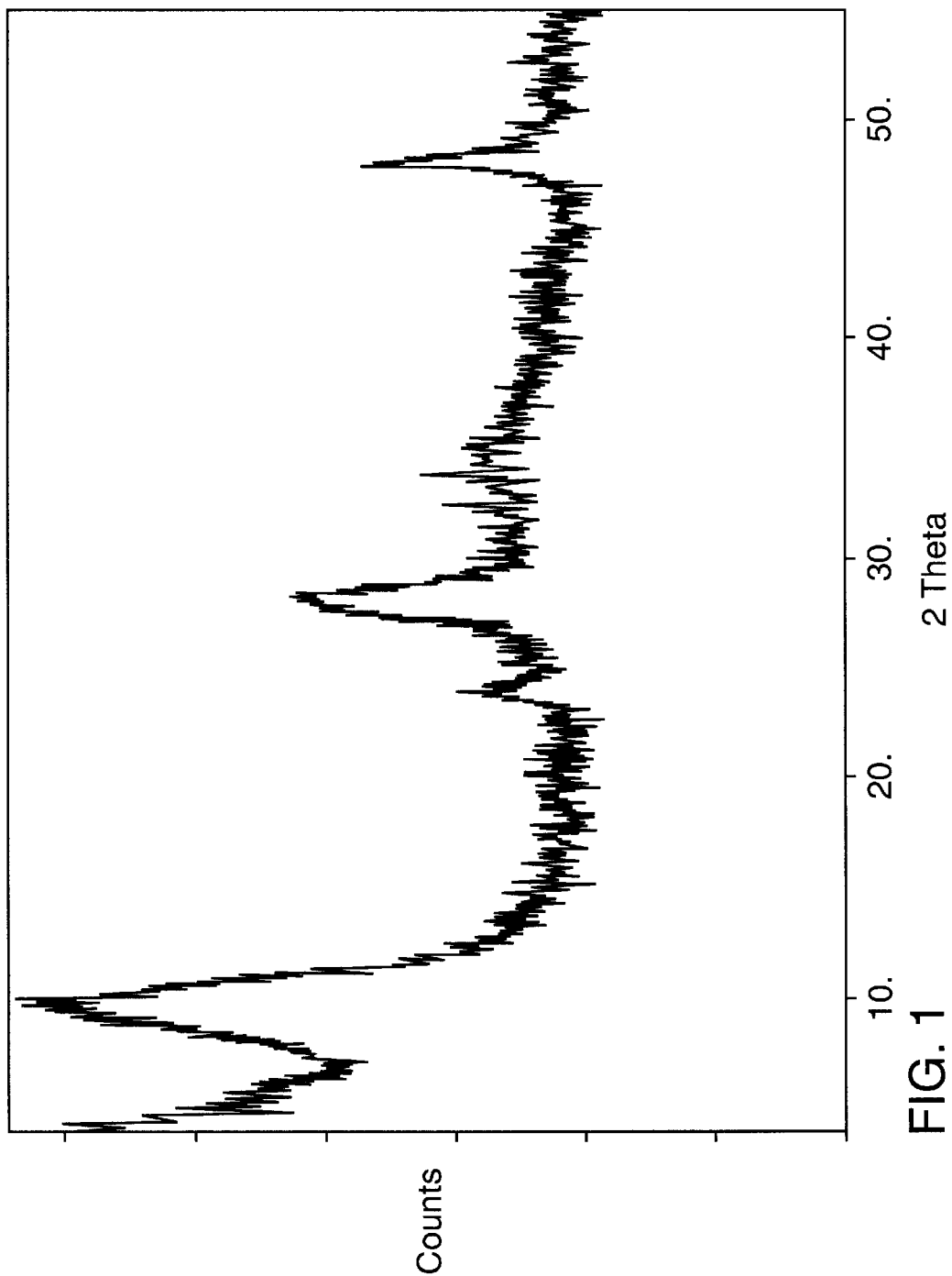
FIG. 1 is an X-ray diffraction pattern of a layered partially crystalline sodium titanate composite of this invention having a d-spacing of 9.4 angstroms.

X-ray powder diffraction (XRD) patterns of the synthesized materials from Examples 1 and 2 were prepared and the results are shown in FIGS. 1–3. The XRD patterns indicate, for the reflux samples, that as the mole ratio of Na/Ti increases, the crystallinity of the titanate material also increases until a ratio of 5 is reached. At this ratio, what appears to be a less crystalline compound, forms.

The most crystalline samples 1-8 and 1-9 were made with the highest ratios of NaOH to Ti and in the strongest base solutions. The X-ray pattern for sample 2-1 shows that this twice hydrothermally treated sample is more crystalline than its precursor 1-2. Samples 2-1, 1-8 and 1-9 exhibited $K_d$ values that were considerably lower than those of the less crystalline samples. For example, sample 1-8 had a strontium $K_d$ of 7000 mL/g in 0.1M $NaNO_3$. Under the same conditions, sample 1-1 had strontium $K_d$ value in excess of 100,000 ml/g.

Examination of the X-ray patterns leads to a conclusion that different types of materials have been made. A more crystalline variety which appears to resemble sample 2-1 are samples 1-1, 1-2, 1-3, and 1-5 and a more gel-like group as exemplified by 1-6, 1-7, and 1-10, and a sample of intermediate crystallinity between the two, sample 1-4. It is sample types 1-10 and 1-7 that provide the highest $K_d$ values.

Sample 1-13 (gel-based) and 1-2 (reflux-based) have similar Na:Ti mole ratios and were reacted for approximately the same time period and temperature, but turn out to be different structure nonatitanates. The X-ray diffraction pattern for the gel sample was similar to the high Na:Ti ratio reaction material 1-10, but has much lower ion exchange selectivity toward $Sr^{2+}$.

Upon comparing the X-ray diffractions patterns of sample 1-12 and 1-3 it appears that longer hydrothermal treatment does not change the crystallinity of the composition but it does have a definite effect upon its ion exchange properties.

EXAMPLE 7

Figure 5:
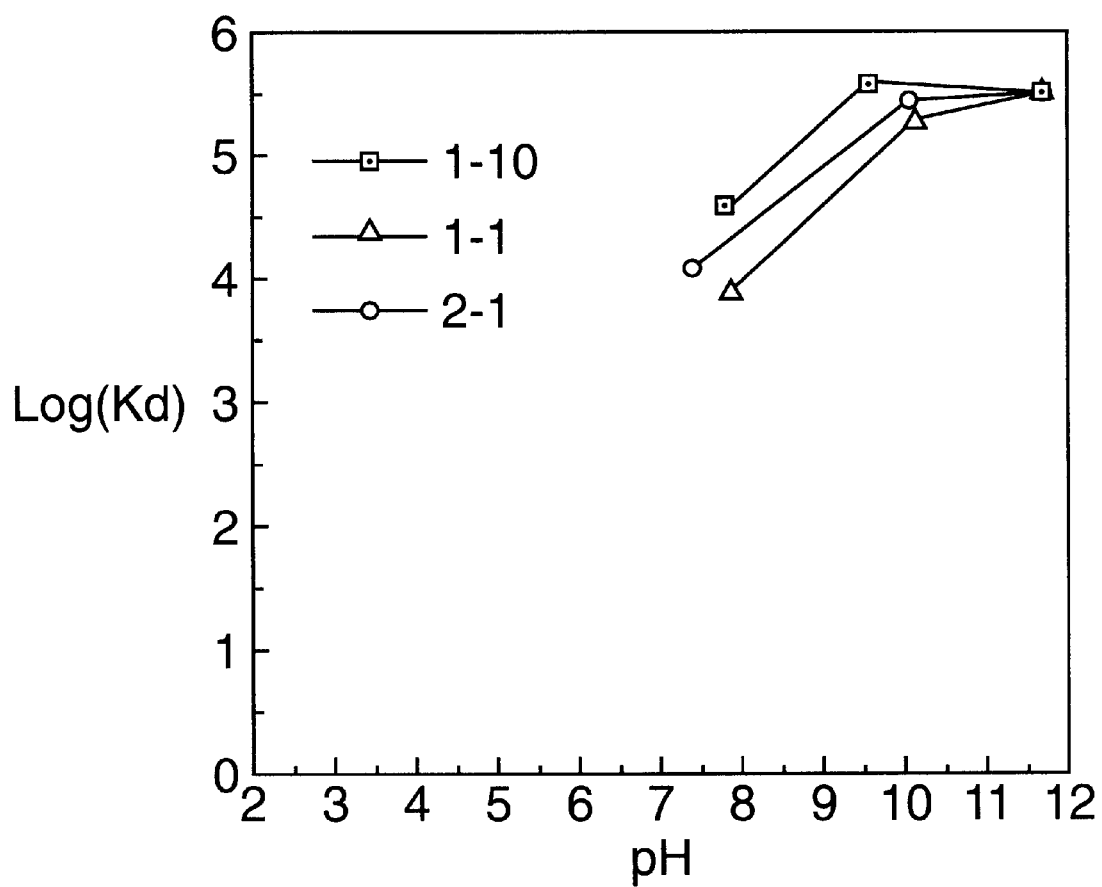
FIG. 5 is a plot of the log $(K_d)$ versus pH for the uptake of strontium by sodium titanate.

The strontium distribution coefficient ($K_d$) results for the sodium titanates prepared in Examples 1 and 2 are function of pH for three of the samples, 1-1, 1-10, and 2-1. The resulting data are shown in FIG. 5. As the pH of the solution decreases, the selectivity for Sr decreases. The $K_d$ at pH values above 11 are reported as being greater than 300,000 because at this pH, the Sr concentration was below the detection limit of the AA unit and a value of 0.1 ppm was used to calculate the $K_d$. It is important to mention that there is typically a large difference between the initial pH of the Sr solutions and equilibrium pH after exchange. This is due to the hydrolysis of the sodium nonatitanate whose reaction is shown below. This property is found in all the layered titanates.

$$Na_4Ti_9O_{20}+xH_2O \rightarrow H_xNa_{4-x}Ti_9O_{20}+xNaOH$$

Distribution coefficients for $Sr^{2+}$ were also determined for these same samples in the presence of 5M $NaNO_3$ and 1M NaOH and 90–95 ppm $Sr^{2+}$ with a solution mass:sample mass ratio of 400:1. The results are found in Table 5, below. Sample 1-10 exhibits the best performance under the conditions studied. When examining samples treated for longer hydrothermal periods with that of their X-ray diffraction equivalents (sample 1-12 with sample 1-3), the Sr $K_d$'s decrease by a factor of 2. This suggests that very short hydrothermal treatment periods will produce highly selective materials.

When reduction of loading was done, a corresponding increase in $K_d$ was observed. For example, the strontium distribution coefficient of sample 1-10 increased to 58,700. The increase in $K_d$ on reduction of the solution volume from 400 mL to 200 mL indicates that the larger volume of solution contains enough strontium ion to exceed the capacity of the exchanger in 6M $Na^+$. We may assume that a $K_d$ of 58,700 g/g represents an uptake of 99% of the added $Sr^{2+}$. The exchange capacity of $Na_4Ti_9O_{20}$ is 4.75 meq/g and in the 200 g solution the uptake was 0.2 meq/g thus 4.2% of the capacity was utilized in the experiment where solution to solid weight ratio was 400 and the $K_d$ was 13,400 g/g. Calculation shows that 97% of the $Sr^{2+}$ was taken up. Thus, the loading was 2×0.2×0.94=0.388 meq or 8% of the exchange capacity. This figure represents a very high value for such strong solutions with such high sodium concentrations.

TABLE 5

| Sample | Initial pH | Final pH | Sr $K_d$ (g/g) |
|---|---|---|---|
| 1-10 | 13.63 | 13.80 | 9,780 |
| 1-11 | 13.63 | 13.82 | 692 |
| 1-12 | 13.63 | 13.74 | 710 |
| 1-1 | 13.63 | 13.74 | 1,270 |
| 2-1 | 13.63 | 13.74 | 1,270 |
| 1-5 | 13.6 | 13.8 | 3,060 |
| 1-4 | 13.6 | 13.7 | 1,730 |

VIM = 400

EXAMPLE 8

Figure 6:
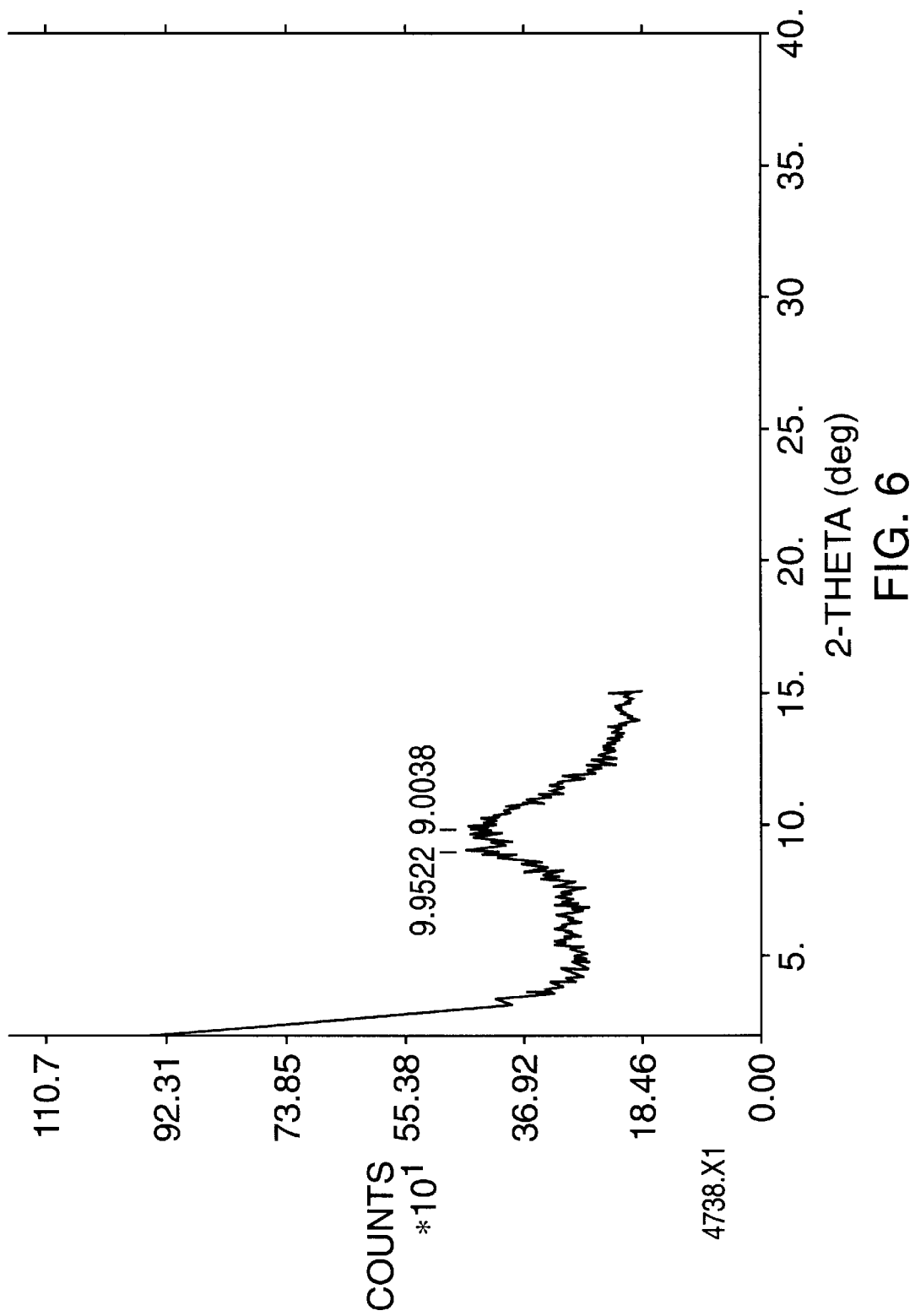
FIG. 6 is the X-ray diffraction pattern of dehydrated layered partially crystalline sodium titanate of this invention having a d-spacing of 9.00 angstroms as prepared in Example 9.
Figure 7:
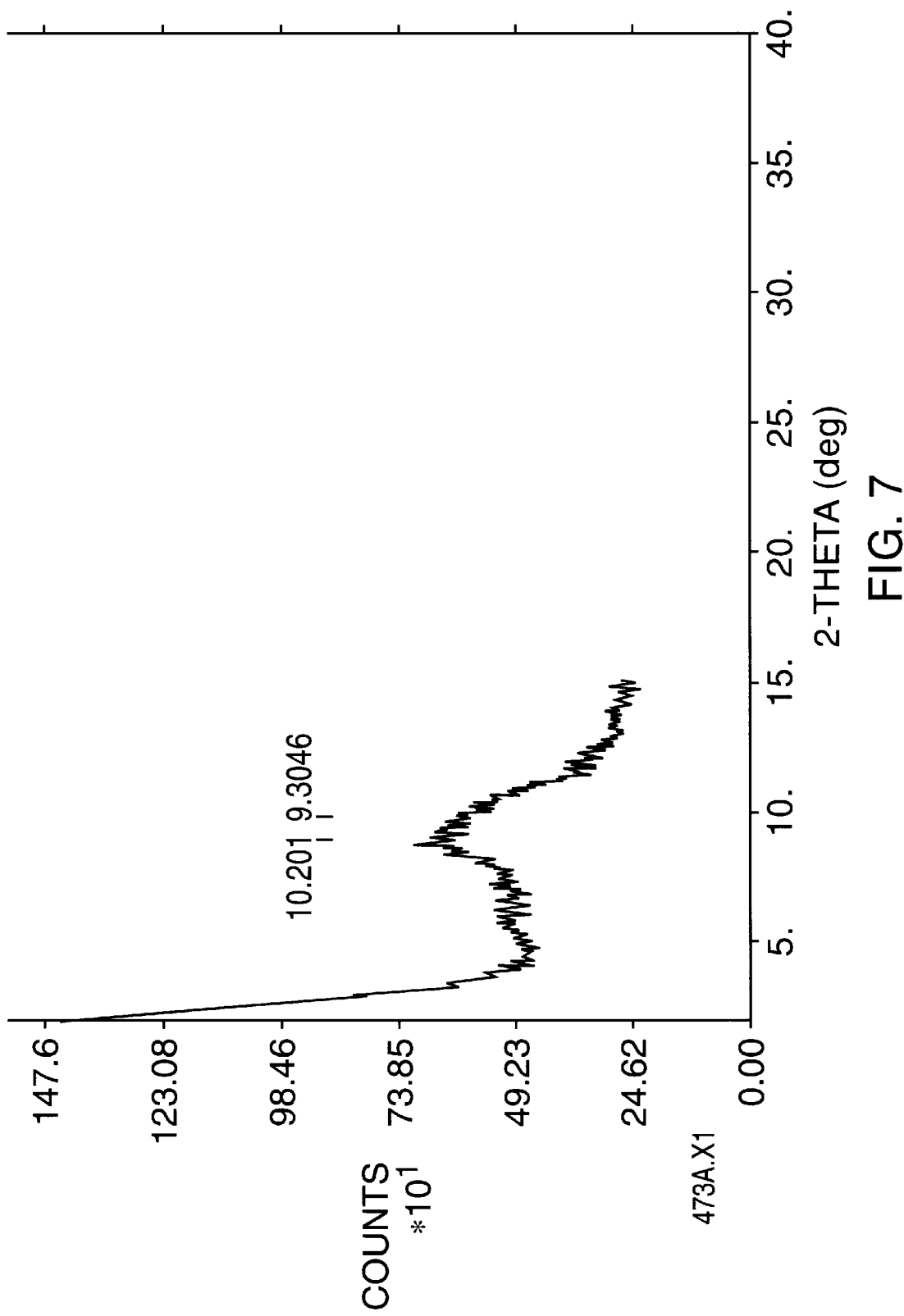
FIG. 7 is the X-ray diffraction pattern of hydrated layered partially crystalline sodium titanate that has a d-spacing of 10.2 angstroms as prepared in Example 9.

A portion of sample 1-6 was placed on a piece of Whatman filter paper and inserted into a longneck round bottom flask which contained distilled deionized water. The flask was gently heated to produce water vapors which would then impregnate the partially crystalline layered sodium titanate sample. A second portion of sample 1-6 was placed in a 75° C. oven until needed. For the $K_d$ measurements, TGA, and XRD pattern of this dried material, the second portion of sample 1-6 was removed from the oven and immediately transferred to the appropriate testing container to help prevent absorption of moisture. The $K_d$ measurements were done using a solution containing 5M $NaNO_3$, 1M NaOH, and 91.67 ppm $Sr^{2+}$. The results are shown in Table 6 below. From the XRD patterns (FIGS. 6 and 7), it can be seen that the dehydrated 1-6 sample possessed a d-spacing in the range of 9.0–9.9 Å while the hydrated sample possessed d-spacing in the range of 9.4–10.2 Å. The results, found in Table 6, show an initial average sodium titanate d-spacing less than about 9.9 angstroms plays a considerable role in promoting the uptake of $Sr^{2+}$ and is related to the state of hydration of the initial exchanger.

TABLE 6

Sr $K_d$'s for a hydrated and slightly dehydrated partially crystalline sodium titanate.

| Sample | Sr $K_d$ (g/g) |
|---|---|
| 1-6 (1) dehydrated | ≧254,000 |
| 1-6 (2) dehydrated | 229,000 |
| 1-6 (1) hydrated | 18,600* |
| 1-6 (2) hydrated | 21,000* |

*The weight of the sample was adjusted for the excess water which is contained by multiplying by 0.8163 which was determined by TGA data.

EXAMPLE 9

The effect of the hydrothermal treatment step on the strontium $K_d$ of a partially crystalline layered sodium titanate was studied. Four parameters were studied: method of gel preparation (sol-gel or reflux), concentration of NaOH in the autoclace, the time, and the temperature of the hydrothermal treatment step.

The source material for the experiments was sodium titanate gel made by the sol-gel method and by the reflux method and made according to Examples 3 and 4. The results in Table 7 indicate that the strontium $K_d$'s for partially crystalline sodium titanates prepared by hydrothermally treating amorphous sodium titanates are two times greater for material treated at 160° C. for 5 hours than at 200° C. for 20 hours. The most statistically significant hydrothermal treatment variable affecting the 24 hour $K_d$ data is the relationship between the concentration of NaOH and the temperature during the hydrothermal treatment step. Control of both of these parameters is necessary to fine tune the crystallinity of the final product.

TABLE 7

The Effect of the Hydrothermal Treatment Conditions on the Strontium $K_d$ of Sodium Titanate

| Sample Number | Gel Method | Temperature ° C. | NaOH M | Time hr | $K_d$ at 24 hours (mL/g) |
|---|---|---|---|---|---|
| 9-1 | sol-gel | 160 | 0 | 5 | 22,400 |
| 9-2 | reflux | 160 | 1 | 5 | 35,500 |
| 9-3 | reflux | 160 | 1 | 5 | 35,500 |
| 9-4 | sol-gel | 160 | 1 | 20 | 21,700 |
| 9-5 | reflux | 200 | 0 | 5 | 8,140 |
| 9-6 | sol-gel | 200 | 1 | 5 | 24,100 |
| 9-7 | sol-gel | 200 | 0 | 20 | 10,600 |
| 9-8 | reflux | 200 | 1 | 20 | 21,700 |
| 9-9 | reflux | 200 | 0 | 20 | 6,660 |

EXAMPLE 10

The strontium $K_d$ of partially crystalline sodium titanate prepared in Example 5 was evaluated. Table 8, below, summarizes the hydrothermal treatment conditions and properties of the four batches of sodium titanate prepared in Example 5. Batches 1 and 2, which were hydrothermally treated for the longest period of time, (160–200° C. for 20 hours), were the most crystalline, as indicated by the low full width at half maximum of the largest peak in their X-ray pattern. These most crystalline materials also have the lowest $K_d$'s because high crystallinity hinders the interlayer diffusion, thereby lowering strontium uptake.

TABLE 8

Summary of the Pilot Plant Hydrothermal Treatments

| Batch | Time at Temp.[1] | Mixer | Yield of Final Product kg | Crystallinity FWHM[2] deg | Sr $K_d$[3] mL/g |
|---|---|---|---|---|---|
| 5-1 | 20 | off | 2.37 | 1.13 | 12,100 ± 2,100 |
| 5-2 | 20 | off | 3.98 | 1.92 | 10,200 ± 420 |
| 5-3 | 5 | off | 1.61 | 2.67 | 19,800 ± 410 |
| 5-4 | 5 | on | 1.23 | 2.23 | 21,100 ± 2,310 |

[1]At temp. = at temperature between 160–200° C.
[2]FWHM = 001 reflection peak full width at half maximum.
[3]5M $NaNO_3$/0.1 M NaOH/68.6 ppm Sr.

Figure 8:
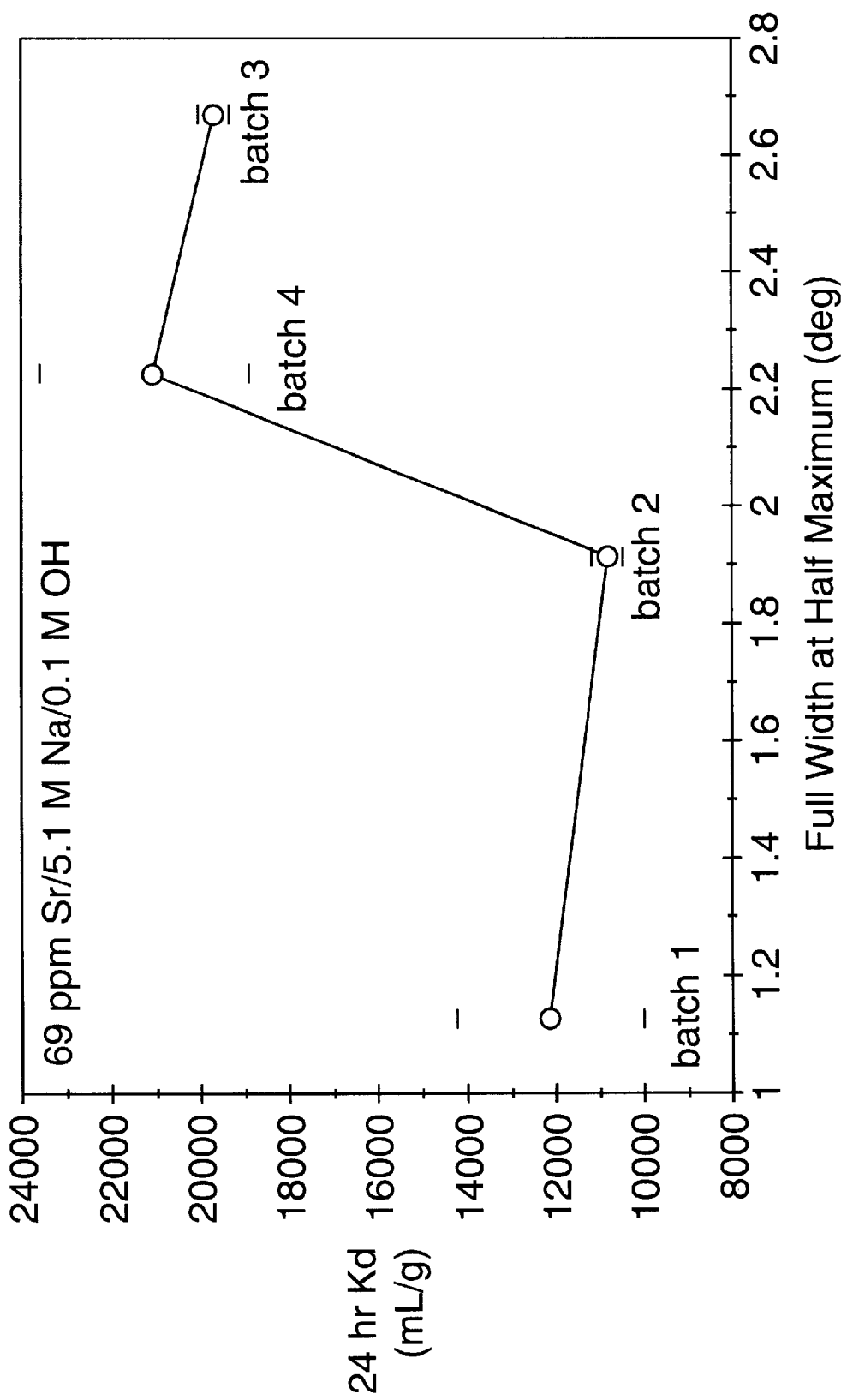
FIG. 8 is a plot of the strontium uptake of a partially crystalline layered sodium titanate prepared in Example 5 as a function of the full-width half maximum (FWHM) peak height of the 001 reflection peak wherein FWHM and sodium titanate crystallinity are inversely related.

The sodium titanate from all four batches have a high strontium $K_d$. But the strontium $K_d$ for the batches hydrothermally treated for 5 hours are about two times higher than for the batches treated for 20 hours (20,500 vs. 11,500 mL/g). This difference may be correlated with the degree of crystallinity of the samples. FIG. 8 is a plot of the strontium $K_d$ of the batches as a function of FWHM (full width at half maximum peak height of the 001 reflection peak). The larger the FWHM, the less crystalline the material. The materials with the higher crystallinity (batches 1 and 2) have the lower $K_d$s.

Figure 9:
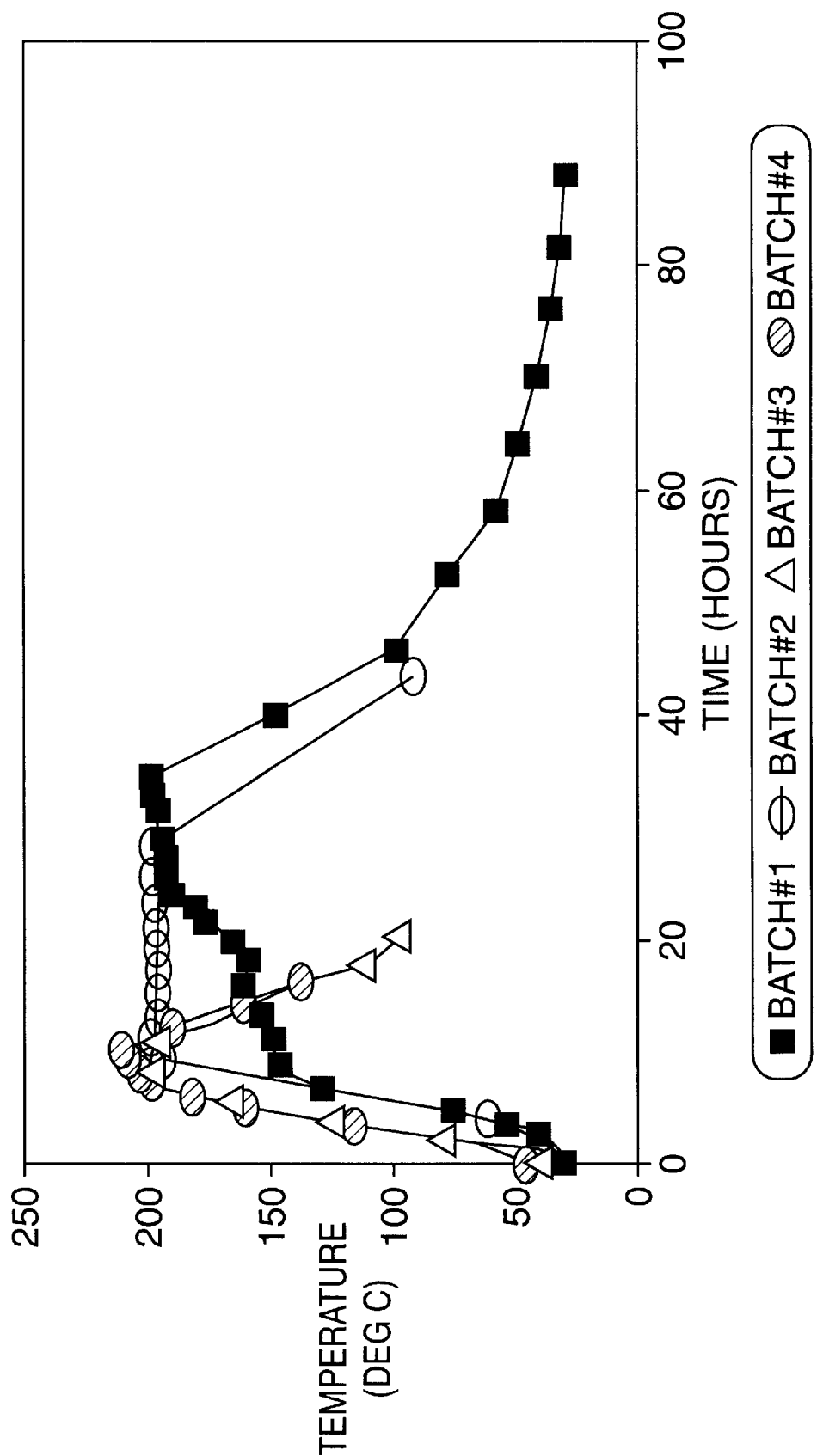
FIG. 9 is a plot of the internal temperature in a reactor vs. time during sodium titanate hydrothermal treatment.

The X-ray pattern for batch 2, shows a major peak at 8.76 angstroms. This peak is still present after stirring the sample with 0.1M NaOH. By this observation, the new peak is not a $H_4Ti_9O_{20}$ phase (which should result if the sample were washed with too much water in the pilot plant). Batch 2 may contain another sodium titanate phase, possibly $Na_2Ti_3O_7$ which has its major peak at 8.270 angstroms. All other batches contain only nonatitanate. Compared to the other batches, FIG. 9 shows that batch 2 has the longest period at the internal temperature of 200° C. (18 hours). This extended heating period may have allowed the new phase to form.

Figure 10A:
Figure 10B:
Figure 10C:
Figure 10D:

FIGS. 10A, B, C, and D show scanning electron micrographs (SEM) of each of the pilot plant batches at 3000 times magnification. The partially crystalline sodium titanate of batches 1 through 3, FIGS. 10A, 10B, and 10C, shows the material to have formed nuggets, while batch 4, FIG. 10D consists of elongated bundles of fibers. While mixing does not affect the resulting strontium $K_d$, it does influence the gross morphology of the exchanger. Mixing the gel during hydrothermal treatment causes shear stresses in the newly forming sodium titanate, which in turn results in a higher number of loose fibers and elongated bundles.

EXAMPLE 11

Fondo XR cement (8.6 g) and sodium titanate (20 g, –200 Mesh) prepared by the method Example 5 were dry blended vigorously for 5 minutes to form a bound sodium titanate. Subsequently, deionized $H_2O$ (14.7 g) was slowly added while mixing continuously. The mixture was allowed to blend for an additional 5 minutes. The paste like mixture was thinly spread over a teflon sheet. The sheet was placed in covered pans and exposed to water saturated in an oven at 0° C. and cured for 48 hrs. The cured sheets were broken down to 20×40 mesh size with mortar and pestle.

EXAMPLE 12

A method for preparing an amorphous sodium titanate bound crystalline sodium titanate is described.

In a beaker located on a magnetically stirred hot plate, 293 g of titanium isopropoxide (TiP) was mixed together with 250 mL of methanol. The solution was heated to 50° C. Next, a solution of 40.7 g NaOH in 400 mL methanol was added to the beaker. To this mixture, 10 g of through 200 mesh sodium titanate prepared by the method of Example 5 was added. After adding a solution of 50 mL methanol and 20 mL water, the solution plus solids mixture was stirred for 1 hour. The resulting thick paste was spread out on a Teflon sheet and air-cured for 6 days. The cured plaque was ground with a mortar and pestle, then sieved to obtain 20–40-mesh particles. The resulting bound ion exchange compound is a semi-crystalline sodium titanate bound with amorphous sodium titanate.

EXAMPLE 13

A preferred method for preparing a titania bound partially crystalline sodium titanate utilizing a liquid hydrolyzable titanium compound as a binder is described.

Six grams of sodium titanate prepared by the method of Example 5, is mixed with 10 mL of a titanium compound having the formula: $TiXX_IX_{II}X_{III}$ wherein X is any constituent and $X_I$, $X_{II}$, $X_{III}$ are each chosen from the group consisting of Cl, BR, I, and OR, and where R is any acyl or alkyl group containing from 1 to 9 carbons. The mixture is agitated at room temperature until it appears dry. The titania bond sodium titanate powder is compressed in a pelletizer to a piece density of 1.8–2.2 g/mL. The pellets are then calcined at 400° C. under moist air for four hours. The resulting compound is a partially crystalline sodium titanate bound with an amorphous titania.

EXAMPLE 14

A preferred method for preparing a titania bound partially crystalline sodium titanate utilizing a solid hydrolyzable titanium compound as a binder is described.

Six grams of sodium titanate prepared by the method of Example 5, is mixed with 10 g of a titanium compound. The titanium compound has the formula $TiXX_IX_{II}X_{III}$, wherein X is any constituent and $X_I$, $X_{II}$, and $X_{III}$ are each chosen from the group consisting of Cl, BR, I, and OR, where R is any acyl or alkyl group containing from 1 to 9 carbons. The mixture is agitated at room temperature until it appears dry. The titania bound sodium titanate powder is compressed in a pelletizer to a piece density of 1.8–2.2 g/mL. The pellets are then calcined at 400° C. under moist air for four hours. The resulting compound is a partially crystalline sodium titanate bound with an amorphous titania.

EXAMPLE 15

A preferred method for preparing a titania bound partially crystalline sodium titanate utilizing solid titanium isopropoxide as a binder is described.

Six grams of sodium titanate prepared by the method of Example 5, was mixed with 10 grams of titanium isopropoxide (TiP). The mixture was agitated at room temperature until it appeared dry. The titania bound sodium titanate was powder compressed in a pelletizer to a piece density of 1.8–2.2 g/ml. The pellets were calcined at 400° C. under moist air for four hours. The resulting compound is a partially crystalline sodium titanate bound with an amorphous titania.

EXAMPLE 16

A preferred method for preparing a titania bound partially crystalline sodium titanate utilizing titanium ethoxide as a binder is described.

Six grams of sodium titanate prepared by the method of Example 5, is mixed with 10 grams of titanium ethoxide. The mixture is agitated at room temperature until it appears dry. The titania bound sodium titanate power is compressed in a pelletizer to a piece density of 1.8–2.2 g/mL. The pellets are then calcined at 400° C. under moist air for four hours. The resulting compound is a partially crystalline sodium titanate bound with an amorphous titania.

EXAMPLE 17

A preferred method for preparing a titania bound partially crystalline sodium titanate utilizing titanium 2-ethylhexyloxide as a binder is described.

Six grams of sodium titanate prepared by the method of Example 5, is mixed with 10 grams of titanium 2-ethylhexyloxide. The mixture is agitated at room temperature until it appears dry. The titania bound sodium titanate power is compressed in a pelletizer to a piece density of 1.8–2.2 g/mL. The pellets are then calcined at 400° C. under moist air for four hours. The resulting compound is a partially crystalline sodium titanate bound with an amorphous titania.

EXAMPLE 18

Column experiments were carried out on sample 1-2 (sodium nonatitanate) using a model solution in order to examine the performance of the exchanger under dynamic conditions. Composition of the model solutions was as follows: 5M $NaNO_3$, 1M NaOH, 0.15M KCl, Cs-13.9 ppm, Sr-8.75 ppm and Ca-4.08 ppm. The volume of the absorbent was 0.85 $cm^3$, the absorbent's layer height was 155 mm, the absorbent granules size was <0.1 mm, and the flow rate was 3 bed volumes (b.v.) per hour. The regeneration of the exchanger was achieved by passing 15 mL of a 0.5M HCl solution through the column at a rate of 0.5 b.v./hr and then subsequent treatment with 20 mL of a solution containing 5M NaOH, and 0.15M KCl (0.5 b.v./hr) to give a regenerated partially crystalline sodium titanate.

The breakthrough curve for Sr sorption is shown in FIG. 11. The curve shows that the partially crystalline sodium titanate effectively purifies approximately 700 column volumes, (c.v.), of the model solution in the first sorption cycle, and after regeneration, the material purifies nearly twice the number of c.v.'s (1200) in the second cycle.

EXAMPLE 19

Pellets of sodium titanate prepared by the method of Example 5 combined with Portland cement and calcium aluminate (Ciment Fondu) were prepared according to the method of Example 11, based on the recipe set forth in Table 9, below.

Sr-$K_d$ measurements for the Fondu and Portland cement at various curing times are found in Table 9 below. The $K_d$ values were taken using standard test conditions. The Sr-$K_d$ values at all curing times are low when compared to Sr-$K_d$ values of 1633 mL/g for the −200 mesh virgin partially crystalline sodium titanate. The Ciment Fondu binder exhibits a slightly higher Sr-$K_d$ than the Portland cement. There was no obvious effect of the curing time on the final properties of the inorganically bound partially crystalline sodium titanates.

TABLE 9

Effect of Curing Time and Cement Composition of Sr-$K_d$ of Bound Sodium Titanate.

| Sample ID | Binder Type 50 wt % | Curing Time (days) | Final Sr Concentration (ppm) | Sr-$K_d$ (ml/g) |
|---|---|---|---|---|
| 15-1 | Ciment Fondu | 4 | 40.2 | 136 |
| 15-2 | * | 11 | 29.9 | 252 |
| 15-3 | * | 21 | 31.0 | 236 |
| 15-4 | Portland Type III | 4 | 54.1 | 50 |
| 15-5 | * | 11 | 55.5 | 44 |
| 15-6 | * | 21 | 56.4 | 40 |

To determine if the sodium titanate was bound by the inorganic binder, samples were analyzed via nitrogen porosimetry. The results are shown in Table 10 below and indicate that the inorganic binders have encapsulated some of the sodium titanate powder as shown by the decrease in both the BET and Langmuir surface areas in the bound samples as compared to the sodium titanate powder.

To determine the extent of mass transfer difficulties, Sr-$K_d$, measurements were taken over a period of 120 hours for bound and unbound samples. FIG. 12 and Table 10 show that the bound sodium titanate exhibits the fastest uptake of Sr. Both organic and inorganic binders reduced the rate of Sr uptake. The organic binder made with the pore former has a relatively quick Sr uptake and eventually reaches the value of the sodium titanate powder. However, the inorganic binders have very slow Sr uptake and do not asymptotically reach the same concentration as with the sodium titanate powder. As mentioned above, the inorganic binder appeared to bind the sodium titanate powder. Since the final concentration of Sr does not approach the final concentration observed with the sodium titanate powder, a portion of the sodium titanate appears be totally encapsulated. Cement bound absorbents using only pure cement have both caustic and mechanical stability, but some mass transfer ability is lost as a result of the binder.

TABLE 10

Effect of Inorganic Binder on Pellet on Surface Area

| Sample | Langmuir Surface Area (m²/g) | BET Surface Area (m²/g) | Average Pore Radius (A) |
|---|---|---|---|
| Sodium Titanate | 106.7 | 59.9 | 39.7 |
| Bound with Ciment Fundu | 39.3 | 22.8 | 43.4 |
| Bound with Portland Type III | 52.1 | 30.0 | 64.1 |

EXAMPLE 20

Methods of introducing porosity into the inorganic binder/ion exchanger system to improve mass transfer are detailed. By increasing the porosity of the ion exchanger pellet, mass transfer of cations into the exchanger increases and therefore increases the amount of radioactive cation captured. Two methods investigated for increasing porosity were gas foaming of the binder-exchanger and addition of inert fillers to the binder-exchanger system. The inert filler was leached out to form porous pellets. All samples using pore formers were prepared by using the general procedure listed in Example 15.

In the first method of producing porous pellets, aluminum was added to the mixture to induce gas formation in the binder-exchange system. The aluminum reacts with water under caustic conditions to produce hydrogen. The hydrogen produces bubbles or voids in the pellet. Results are shown in Table 11 for varying loadings of aluminum and particle size. All of the samples passed the standard caustic stability test. Samples 16-1 and 16-2 were subjected to a small normal force by placing a small weight on the sheet. These sheets did not expand to the same extent as the other samples and have slightly lower product yields. The $K_d$ values for all the porous pellets are significantly lower than that seen with the virgin partially crystalline sodium titanate powder which has a $K_d$ value typically greater than 10,000 mL/g.

TABLE 11

Effect of Al as Porosity Modifier on Sr-$K_d$ of Fondu Bound Sodium Titanate.

| Sample ID | Binder Wt % | Exchanger Wt % | Aluminum Wt % | Al Size (Micron) | Final Sr Concentration (ppm) | Sr-$K_d$ (ml/g) |
|---|---|---|---|---|---|---|
| 16-1 | 49 | 49 | 2 | 20 | 29.6 | 132 |
| 16-2 | 49 | 49 | 2 | 45 | 19.8 | 246 |
| 16-3 | 49 | 49 | 2 | 20 | 48.0 | 43 |
| 16-4 | 49 | 49 | 2 | 45 | 46.2 | 48 |
| 16-5 | 48 | 48 | 4 | 20 | 30.0 | 129 |
| 16-6 | 48 | 48 | 4 | 45 | 29.3 | 134 |

One aluminum filled porous sample was sent for surface area determination via nitrogen porosimetry and exhibited a Langmuir surface area of 111.1 m²/g, a BET surface area of 63.2 m²/g, and an average pore radius of 32.2 angstroms. The aluminum filler increased both the BET and Langmuir surface areas in the bound samples to surface areas similar to that seen in the unbound sodium titanate. Even with the increased surface area, the Sr-$K_d$ for this sample was small.

In the second method of producing porous pellets, inorganic or organic fillers were blended and cured with the binder-exchanger system described in Example 11. The inorganic fillers were calcium carbonate and calcium sulfate while the organic filler was a low molecular weight hydrocarbon wax. These fillers have low solubility in water but can be leached out with the appropriate leaching solutions.

TABLE 12

Effect of Inorganic Fillers on Sr $K_d$ of Fondu Bound Sodium Titanate.

| Sample ID | Sample | Particle Size (mesh) | Sr $K_d$ (ml/g) |
|---|---|---|---|
| 16-7 | Sodium Titanate bound with 50% Ciment Fondu (20 vol % extracted wax) | 20 × 40 | 150 |
| 16-8 | " | −200 | 112 |
| 16-9 | Sodium Titanate bound with 50% Ciment Fondu (20 vol % extracted wax) | 20 × 40 | 150 |
| 16-10 | " | −500 | 132 |

Typical results for the two inorganic fillers are shown in Table 12. These samples were each leached with acid and the sodium titanate was regenerated using sodium hydroxide. All of the $K_d$ values of the inorganic salt filler pellets were lower than the $K_d$ of the virgin sodium titanate powder.

Organic pore formers were used to increase porosity without introducing additional calcium to the system. The organic pore formers were added into the system at different volume percent loading as listed in Table 13. There was no increase in $K_d$ as the porosity due to leached wax increased. The strontium $K_d$ did increase with increased exchanger loading for samples 16-13 and 16-14. This was also observed with the inorganic fillers. There appears to be an upper limit to the amount of exchanger that can be added without loss of mechanical strength. The $K_d$ values were again lower than the virgin sodium titanate powder.

TABLE 13

Effect of Organic Fillers on Sr-$K_d$ of Fondu Bound Sodium Titanate.

| Sample ID | Binder Wt % | Exchanger Wt % | Filler Type | Filler Wt % (Vol %) | Sr $K_d$ (ml/g) |
|---|---|---|---|---|---|
| 16-11 | 34.6 | 34.6 | Petrolite 185 | 30.9 (60%) | 383 |
| 16-12 | 30.8 | 46.5 | Petrolite 185 | 22.7 (40%) | 524 |
| 16-13 | 36.9 | 36.9 | Petrolite 185 | 26.3 (50%) | 299 |
| 16-14 | 43.0 | 28.8 | Petrolite 185 | 27.7 (50%) | 552 |
| 16-15 | 37.0 | 37.0 | Petrolite 185 | 26.0 (50%) | 372 |
| 16-16 | 37.0 | 37.0 | Petrolite 185 | 26.0 (50%) | 429 |

EXAMPLE 21

Cement or calcium exchanged bound sodium titanate can be fully regenerated with an acid wash followed by a caustic wash. However, when the acid wash was tested on cement or calcium exchanged, cement bound sodium titanate, the pellet broke apart, indicating acid attack on the binder.

To select the best acid regenerate which does not harm the binder, we measured the amount of $Ca^{+2}$ in solution after shaking either 500 mg of Ca-titanate or cured cement (without an exchanger) in test solutions for 72 hours. The calcium titanate was made by shaking sodium titanate in a 2M solution of $CaCl_2$ for several days. The test solutions where made from different concentrations of acetic acid, nitric acid, nitric acid plus 1M NaCl, and NaCl. For each type of solution, lower pH's removed more $Ca^{+2}$ from the titanate. Below pH 5.5, nitric acid mixed with 1M NaCl is the best regenerant, removing the most calcium from calcium titanate. Acidic conditions are required to displace $Ca^{+2}$ with $H^{+1}$. The presence of NaCl further enhances the amount of $Ca^{+2}$ released by increasing the ionic strength of the solution, thereby increasing the driving force for calcium to leave the exchanger.

The same solutions tested with the Ca-titanate were tested with cured cement containing no exchanger. Regardless of the solution, the cement broke apart when the pH$\leq$2. For pH$\geq$3, the cement released very little $Ca^{+2}$ for all solutions except acetic acid. Based on these observations, a solution of 0.01M nitric acid plus 1 M NaCl (initial pH=3.1) is the best regenerant.

Also evaluated were procedures to regenerate bound Na-titanate (assumed to be both the Ca and Na form) into a form with a larger amount of Na using a two step procedure. For the first step, a solution of 0.01M nitric acid plus 1M NaCl was passed through a column packed with sodium titania bound with 50 wt % Cement Fondu-XR (sample 16-1). The acid solution was passed through the column until the effluent pH reached 4 (about 350 column volumes). Next, half of the acid-washed sample was treated with 82 mL 0.1M NaOH, and the other half with 68 mL of 2M NaOH. All samples maintained mechanical strength after the treatments.

The untreated sample, the acid washed sample, and the 0.1M NaOH treated sample all have nearly the same strontium uptake ($K_d$ between 161–264 mL/g based on sodium titanate weight within the pellet). However, the strontium uptake of the sample regenerated with the 2 M NaOH was 3.9 times higher than the original sample (623 vs 161 mL/g).

The low $K_d$ of the regenerated bound sample with respect to the virgin sodium titanate powder (623 vs. 10,000 mL/g) probably indicates that mass transfer within the pellet must be improved by increasing the porosity.

EXAMPLE 22

Partially crystalline layered sodium titanate unbound and bound with 50 wt % Ciment Fondu was tested for radiation stability. The samples were irradiated for 250, 500, 750 and 1000 Mrad of exposure. All of the sodium titanate powders exhibited a $K_d$ of approximately 40,000 ml/g. The Sr-$K_d$ values of the irradiated bound samples are all equivalent with a value of 150 ml/g, which is consistent with the values seen in Table 9. The unirradiated sample had a slightly higher $K_d$ and may be within experimental error of the analytic technique. All of the bound samples qualitatively exhibited excellent mechanical strength after irradiation and treatment with caustic.

EXAMPLE 23

Sodium titanate gel was tested as a binder for partially crystalline sodium titanate and found to have good mechanical strength, be resistant to caustic, and enhance the strontium uptake of sodium titanate. Since the sodium titanate gel is inorganic, this binder will have a high resistance to damage by radiation.

Sodium titanate as prepared in Example 5 was bound with sodium titanate gel by two different methods. In the first method according to Example 12, the binder was formed by making a sodium titanate sol-gel (methanol, NaOH, and titanium isopropoxide) and adding the sodium titanate exchanger before curing. In the second and preferred method according to Example 13, titanium isopropoxide (TiP) was mixed with the sodium titanate ion exchanger and allowed to solidify in moist air before curing.

Table 14 summarizes the effectiveness of titanate as a binder for sodium titanate with respect to ion exchange capacity and mechanical strength. Bound samples passed the mechanical test if they withstood being shaken for 24 hours in solutions containing 64 ppm Sr, 5M $NaNO_3$, and 0.1M NaOH (marked as "P" in Table 14). Those that failed are designated by "F".

The presence of the titanate binder enhances strontium uptake by sodium titanate. Compared to the unbound sodium titanate (19-1), samples 19-2 and 19-3, bound with the gel method, took up 1.76 times more strontium; and sample 19-6, bound with the TiP method, took up 2.9 times more strontium. Amorphous sodium titanate (gel) by itself gives a high $K_d$ for Sr (17,000 mL/g). The high strontium $K_d$s may be the result of a combination of the binder enhancing mass transfer and the powder having a high capacity for strontium.

TABLE 14

Strontium Uptake by Sodium Titania bound with Amorphous Sodium Titanate. Bound samples 20–40 mesh -- Feed 64 ppm Sr/5.1 M $NaNO_3$/0.1 M NaOH

| Sample | Binder | Form | Curing Method | Mechanical Strength* | $K_d$ mL/g |
|---|---|---|---|---|---|
| 19-1 (batch 2) | none | powder | — | — | 10,930 |
| 19-2 | gel | plaque | 6 days in air at room temperature | P | 19,220 |
| 19-3 | gel | extrudate | 6 days in air at room temperature | P | 19,220 |
| 19-4 | gel | extrudate | 4 days in water at room temperature; 85° C. in air overnight | F | — |
| 19-5 | TiP | plaque | 2 days in air at room temperature | F | — |
| 19-6 | TiP | plaque | 85° C. in air overnight | P | 31,800 |

EXAMPLE 24

This example details the measurement of strontium equilibrium batch capacities for titania bound Na-titanate prepared according to Example 13, as well as each of the unbound pilot plant batches prepared in Example 5. As shown in Table 15, the 24-hour $K_d$ of titania bound sodium titanate is 3.5 times higher than powder (37,000 vs. 10,800 mL/g for 64 ppm Sr, 5.1M $NaNO_3$, and 0.1M NaOH). However, the capacity of the TiP-bound sodium titanate is nearly the same as for the unbound material (batch 2). Because the presence of the titania binder does not affect capacity, the binder itself may take up strontium. $K_d$ measurements of the titania binder indicates that this is the case, with a $K_d$ of 17,000 mL/g (64 ppm Sr, 5.1M $NaNO_3$, 0.1M NaOH). The powder combined with the binder has a higher strontium uptake than the powder of the binder by itself. The titania binding process produces a composite material which has enhanced mass transfer.

TABLE 15

Capacities of Strontium Exchangers. Feed: 55.4 ppm Sr, 5.1 M Na, 0.1 M OH.

| Exchanger | Capacity (meq/g) | $K_d$ (mL/g) |
|---|---|---|
| Na-Titanate pilot plant batch 1 | 0.897 | 12,100 |
| Na-Titanate pilot plant batch 2 | 1.06 | 10,800 |
| Na-Titanate pilot plant batch 3 | 1.112 | 14,800 |
| Na-Titanate pilot plant batch 4 | 1.19 | 21,000 |
| Na-Titania bound with amorphus Na-Titanate | 0.991 | 37,000 |

EXAMPLE 25

This Example details a method for manufacturing sodium titanate ion exchange pellets using an organic binder with introduced porosity to improve mass transfer inside the pellet. Partially crystalline sodium titanate powder produced in Example 5 had a $Sr^{2+}$ distribution coefficient ($K_d$) of 16900 mL/g. The sodium titanate powder was subsequently bound with 20 wt % cellulose acetate. While $K_d$ testing on the preliminary pellets were positive ($K_d$ Ca 2500), later pellets consistently tested low with $K_d$ values less than 300. The extreme decrease in $K_d$ was due to decreased mass transfer through the cellulose acetate. Incorporating porosity in the pellet using a binder with pore former, consistently recovered the $K_d$ to values greater than 1600 mL/g.

The process to produce pellets with pore former consisted of dissolving cellulose acetate (22.5 wt %) in an acetone (47.5 wt %)/formamide (30.0 wt %) mixture. Pores are formed by a phase inversion of the acetone/formamide/water system when the pellet is later extruded into water. The solution was blended with sodium titanate at a weight ratio of 1:4 cellulose acetate to ion exchanger. Once blended, the mixture was stirred to volatilize enough acetone to leave a thick paste. The paste was extruded into a water wash bath containing 0.1% Triton XL-80N, 50% glycol and 25% glycerol at 10° C. The purpose of the water bath is to leach the formamide/acetone solvent and to minimize the pore collapse due to drying of the membrane. The low temperature facilitates the precipitation of the polymer and freezing of the pore structure. The surfactant reduces pore collapse upon drying by reducing capillary pressures. The reason for the loss of mass transfer upon binding is apparent. from Table 16. The surface area of virgin sodium titanate is greater than 139 $m^2$/g, but the extruded powder blended with cellulose acetate and acetone showed very little surface area (<1 $m^2$/g). The cellulose acetate had binded the surface of the sodium titanate powder. By using the pore former solution and a cooled surfactant water bath, the surface area increased to greater than 91 $m^2$/g. Additionally, the wetability of the pellets using the new binder process also increased. The pellets with pore former wetted more easily due to intact pores and presence of residual surfactant in the pores.

TABLE 16

| Sodium Titania bound With - | BET Surface Area (m²/g) | Pore Volume (cc/g) | Average Pore Radius (A) | Langmuir Surface Area (m²/g) | Wetability Testing (5 min) |
|---|---|---|---|---|---|
| Ca-Montmorillonite Powder | 82.2 | 0.163 | 39.6 | 139.6 | |
| Cellulose Acetate | <1 | — | — | <1 | — |
| 20 wt % Cellulose Acetate/Acetone Air Dry - 23° C. | <1 | — | — | <1 | Very Little Penetration |
| 20 wt % Cellulose Acetate/Acetone 10° C. Quench - Air Dry | 57.6 | 0.116 | 40.2 | 100.1 | ¼ Dia. Wetted |
| 20 wt % Cellulose Acetate/Acetone/ Formamide 10° C. Quench - Air Dry | 52.8 | 0.108 | 40.8 | 91.9 | Complete |
| 20 wt % Ethyl Cellulose/ Propanol 10° C. Quench - Air Dry | 48.8 | 0.102 | 41.8 | 86.9 | ⅛ Dia. Wetted |

EXAMPLE 26

This example demonstrates that heat treatment increases the mechanical strength of titania bound sodium titanate. When partially crystalline sodium titanate is mixed with a hydrolyzable titanium compound in air and stirred for about one hour, a paste like material is obtained due to the hydrolysis of TiP to form titania/titanium hydroxide. This material was then cured at room temperature in air and then dried at 90° C. overnight. After drying the material was ground to below 40 mesh. The titania bound sodium titanate powder was compressed in a pelletizer to a piece density of 1.8–2.2 g/ml. The pellets were then calcined at 200° C., 300° C. and 400° C., respectively. After 4 hours of thermal treatment, the pellets were crush tested using the ASTM method D4179. The physical properties of the crushed product were combined with product AW-300 zeolite, manufactured by Des Plaines, Ill., UOP. The in strument used was an Instron model 4502 with a 100 Newton load cell. The results are found in the following Table 17.

TABLE 17

| | Tip-bound Sodium Titanate Pellets | AW-300 Pellets |
|---|---|---|
| Radial stress at maximum | 519 PSI | 343 PSI |
| Axial stress at maximum | 2354 PSI | — |

All the calcined titania bound sodium titanate pellets have very good mechanical strength with strong resistance against degradation in alkali solution. The strontium distribution constants (Kds) for these pellets were measured both as intact pellets and after crushing to 40–100 mesh. These results are found in Table 18.

TABLE 18

| Tip Bound Material | Strontium Kd |
|---|---|
| Calcined at 200° C., 40–100 mesh | 21531 mL/g |
| Calcined at 200° C., intact pellets | 24063 mL/g |
| Calcined at 300° C., 40–100 mesh | 19079 mL/g |
| Calcined at 300° C., intact pellets | 3661 mL/g |
| Calcined at 400° C., 40–100 mesh | 17114 mL/g |
| Calcined at 500° C., intact pellets | 20000 mL/g |
| Uncalcined, 40–100 mesh | 51181 mL/g |
| Uncalcined, intact pellets | 59014 mL/g |

EXAMPLE 27

Partially crystalline sodium titanate made according to the method of Example 5 was added to a slurry of hydrous titania. Methyl cellulose was added as organic binder to form the material before calcination. The mixture was extruded and calcined at 560° C. for 4 hours. The calcined extrudates exhibited good mechanical strength, but powdered in alkali solution.

EXAMPLE 28

Partially crystalline sodium titanate made using the method described in Example 5 was mixed with titania hydrate powder. The mixture was pelleted to a piece density of 1.8–2.2 g/ml. The pellets were then calcined at 400° C. and 560° C., respectively. After 4 hours of thermal treatment, calcined extrudates have reasonably good mechanical strength, but powdered in alkali solution.

EXAMPLE 29

The titania bound sodium titanate powder made using method describing in Example 13 was mixed with titania hydrate powder. The mixture was pelleted to a piece density of 1.8–2.2 g/ml. the pellets were then calcined at 400° C. and 560° C., respectively. After 4 hours of thermal treatment, all the pellets have very good mechanical strength with strong resistance against degradation in alkali solution.

EXAMPLE 30

A process for making titania bound crystalline sodium titanate pellets using a motorized pellet former, which is facilitated by the presence of a solid lubricant, namely stearic acid, is described. The titania bound crystalline sodium titanate powder was mixed with 0.5%–4% of stearic acid and pelletized with tablet press, Coulton 215, to a piece density of 1.8–2.2 g/ml. The pellets were then calcined at 400° C. either in the air or in air saturated with moisture at room temperature. After 4 hours of thermal treatment, all the pellets have very good mechanical strength with strong resistance against degradation in alkali solution.

The strontium Kd was measured for three samples: intact pellets; pellets ground to 16–45 mesh; and to below 45 mesh. The intact pellets had a $K_d$, of 11,860 mL/g. The 16–45 mesh, material has a $K_d$ of 11,531, and the 45+ mesh material had a $K_d$ of 12,813.

EXAMPLE 31

Titania bound crystalline sodium titanate prepared by the method of Example 13 was used to remove uranium from an aqueous solution.

200 mg of 20–40 mesh titania bound sodium titanate pellets were placed in a beaker. A 25 ml solution comprising 50 ppm uranium was contacted with the solid sodium titanate for 24 hours. The solution concentration of uranium after 24 hours was 3 ppm. This translates to a uranium Kd of over 1600 mL/g.

EXAMPLE 32

A method for converting partially crystalline sodium titanate into crystalline hydrogen titanate followed by testing the hydrogen titanate as an ion-exchanger is described.

10 grams of partially crystalline sodium titanate prepared as in Example 5 was added to a liter solution of 0.1 N $HNO_3$. The mixture was shaken for 18 hours during which time the solution pH increased from about 1.38 to about 1.46. The solids were filtered from the solution, recovered, and dried. The resulting crystalline hydrogen titanate was tested for its ability to exchange various metal ions and the ion-exchange test results are reported in Table 19.

TABLE 19

Hydrogen Titanate Ion Exchange Capacities

| Target Metal | Initial Concentration (ppm) | $K_d$ (mL/g) |
| --- | --- | --- |
| Yb | 78 | 3890.0 |
| Zr | 51 | 12650 |
| Mo | 11 | 10900 |
| Ag | 19 | 9400 |
| Ti | 17 | 5566.667 |
| Pb | 5.6 | 5500 |
| Cr | 4.3 | 5280 |
| V | 20 | 4900 |
| Fe | 15 | 4900 |
| Cs | 19.7 | 4280 |
| Sn | 26 | 2790 |
| Sb | 29 | 2500 |
| As | 19 | 1800 |
| Y | 18 | 1190 |
| Cd | 20 | 614.2857 |
| K | 29 | 400 |
| Hg | 18 | 386.4865 |
| Cu | 24 | 352.8302 |
| Ba | 3.6 | 350 |
| Rb | 19 | 273 |
| Sr | 20 | 156.4103 |
| Zn | 18 | 80 |
| Pd | 18 | 64 |
| Co | 25 | 17.05882 |
| Ni | 23 | 43.75 |
| Al | 26 | 30 |
| Pt | 18 | 29 |
| Mg | 19 | 26.3337 |

Solution pH = 2–3

We claim:

1. A method of manufacturing a titania bound ion exchange composition of matter comprising the steps of:
   (a) admixing a hydrolyzable titanium compound and crystalline sodium titanate for a predetermined period of time sufficient to partially hydrolyze the hydrolyzable titanium compound to give a titania bound ion exchange composition, said hydrolyzable titanium compound having the formula $TiXX_IX_{II}X_{III}$, wherein X, $X_I$, $X_{II}$, and $X_{III}$ are each selected from the group consisting of Cl, Br, I, and OR, where R is any acyl or alkyl group containing between about 1 and about 9 carbons and wherein R may make up one or more points of contact with Ti; and
   (b) drying the titania bound ion exchange composition to give a dried titania bound ion exchange composition.

2. The method of claim 1 wherein the dried titania bound ion exchange composition is compacted to a piece density of from 1.5 to 2.5 g/ml to give a compacted titania bound ion exchange composition.

3. The method of claim 2 wherein the dried titania bound ion exchange composition is compressed into pellets.

4. The method of claim 2 wherein the dried titania bound ion exchange composition is ground into a powder prior to compacting to give a compacted titania bound ion exchange composition.

5. The method of claim 2 wherein the compacted titania bound ion exchange composition is calcined at from about 200° C. to about 500° C. for a period of time ranging from about 30 minutes to about 5 hours or more to give a calcined titania bound ion exchange composition.

6. The method of claim 5 wherein the calcining takes place in the presence of oxygen.

7. The method of claim 1 wherein the titania bound ion exchange composition is bound in the presence of alcohol.

8. The method of claim 1 wherein the R is any acyl or alkyl group containing about 2 to about 4 carbons.

9. The method of claim 1 wherein the titania bound ion exchange composition is prepared by admixing crystalline sodium titanate, titanium isopropoxide, and methanol in an air atmosphere.

10. The method of claim 1 wherein the crystalline sodium titanate has the formula $Na_{3.4-4.4}Ti_{8.4-9.2}O_{18.5-20.6}$.

11. A titania bound ion exchange composition of matter prepared by the method of claim 1.

12. An ion exchange composition of matter prepared by the method of claim 1 comprising from about 40 to about 95 weight percent crystalline sodium titanate and from about 5 to about 60 weight percent titania binder.

13. The ion exchange composition of claim 12 wherein the crystalline sodium titanate has the formula $Na_4Ti_9O_{20}$.

14. A method of manufacturing a titania bound ion exchange composition of matter comprising the steps of:
   (a) admixing a hydrolyzed titanium compound having the formula $TiXX_IX_{II}X_{III}$, wherein X, $X_I$, $X_{II}$, and $X_{III}$ are each selected from the group consisting of Cl, Br, I, and OR, where R is any acyl or alkyl group containing between about 1 and about 9 carbons and wherein R may make one or more points of contact with Ti with a crystalline sodium titanate to give a wet titania bound ion exchange composition;
   (b) drying the wet titania bound ion exchange composition to give a dried titania bound ion exchange composition;
   (c) compacting the dried titania bound ion exchange composition to a piece density of from 1.5 to 2.5 g/ml to give a compacted titania bound ion exchange composition; and
   (d) calcining the compacted titania bound ion exchange composition from about 30 minutes to about 5 hours or more to give a calcined titania bound ion exchange composition.

15. The method of claim 14 wherein the titania bound ion exchange composition of matter is bound in the presence of alcohol.

16. The method of claim 14 wherein calcining step (d) takes place in the presence of oxygen.

17. The method of claim 14 wherein calcining step (d) takes place in the presence of an atmosphere selected from the group air and moist air.

18. The method of claim 14 wherein for the hydrolyzed titanium compound of step (a), R is any acyl or alkyl group containing about 2 to about 4 carbons.

19. An ion exchange composition of matter prepared by the method of claim 14 comprising from about 40 to about 95 weight percent crystalline sodium titanate and from about 5 to about 60 weight percent titania binder.

20. The ion exchange composition of claim 19 wherein the crystalline sodium titanate has the formula $Na_4Ti_9O_{20}$.

21. A method of manufacturing a sodium titanate bound crystalline sodium titanate composition of matter comprising the steps of:
   (a) preparing a wet ion exchange composition by admixing crystalline sodium titanate having the formula $Na_4Ti_9O_{20}$ with titanium isopropoxide to give a wet titania bound ion exchange composition;
   (b) drying the wet titania bound ion exchange composition in air to give a dried titania bound ion exchange composition;
   (c) grinding the dried titania bound ion exchange composition to give a powdered titania bound ion exchange composition;
   (d) compacting the powdered titania bound ion exchange composition to give a compacted titania bound ion exchange composition having a piece density of from 1.8 to 2.2 g/ml; and
   (e) calcining the compacted titania bound ion exchange composition at a temperature of from about 200° C. to about 500° C. for a period of time ranging from about 30 minutes to about 5 hours or more.

22. The method of claim 21 wherein the titania bound ion exchange composition of matter is bound in the presence of alcohol.

23. The method of claim 21 wherein a lubricant is added to the dried ion exchange composition prior to compacting step (c) to give a dried titania bound ion exchange composition including from about 0.1 to about 4.0 weight percent lubricant.

24. The method of claim 21 wherein the lubricant is stearic acid.

25. The method of claim 21 wherein a pore former is added to the titania bound ion exchange composition prior to compacting step (c).

26. The method of claim 21 wherein the calcined titania bound ion exchange composition is ground into particles.

27. A titania bound crystalline sodium titanate prepared by the method of claim 21.

28. An ion exchange composition of matter prepared by the method of claim 21 comprising from about 40 to about 95 weight percent crystalline sodium titanate and from about 5 to about 60 weight percent titania binder.

29. The ion exchange composition of claim 28 wherein the crystalline sodium titanate has the formula $Na_4Ti_9O_{20}$.

* * * * *